United States Patent
Presgraves et al.

(10) Patent No.: US 8,732,105 B1
(45) Date of Patent: *May 20, 2014

(54) METHOD TO BUILD, ANALYZE AND MANAGE A REAL WORLD MODEL IN SOFTWARE OF A SAFETY INSTRUMENTED SYSTEM ARCHITECTURE FOR SAFETY INSTRUMENTED SYSTEMS IN A FACILITY

(71) Applicant: Applied Engineering Solutions, Inc, Greenville, SC (US)

(72) Inventors: Carolyn Crosby Presgraves, Anderson, SC (US); John Weldon Kelley, III, Anchorage, AK (US); Cody O'Neal Wyndham Gentry, Greenville, SC (US); Kenneth James O'Malley, Jr., Simpsonville, SC (US); Michael Dennis Scott, Anchorage, AK (US); Brian Dudley Merriman, Anderson, SC (US)

(73) Assignee: Applied Engineering Solutions, Inc., Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/966,241

(22) Filed: Aug. 13, 2013

Related U.S. Application Data

(63) Continuation-in-part of application No. 13/251,051, filed on Sep. 30, 2011, now Pat. No. 8,521,676.

(60) Provisional application No. 61/388,423, filed on Sep. 30, 2010, provisional application No. 61/388,437, filed on Sep. 30, 2010.

(51) Int. Cl.
*G06F 17/00* (2006.01)
*G06N 5/02* (2006.01)

(52) U.S. Cl.
USPC ............................................................ 706/46

(58) Field of Classification Search
USPC ........................................ 706/46; 700/21, 79
See application file for complete search history.

(56) References Cited

U.S. PATENT DOCUMENTS

| | | | |
|---|---|---|---|
| 7,813,820 B2 | 10/2010 | Opem et al. | |
| 8,538,558 B1 * | 9/2013 | Sabapathy et al. | 700/4 |
| 2005/0027379 A1 | 2/2005 | Dyk et al. | |
| 2009/0012631 A1 | 1/2009 | Fuller | |
| 2010/0004761 A1 | 1/2010 | Flanders et al. | |
| 2012/0035750 A1 * | 2/2012 | Edel | 700/79 |
| 2012/0101953 A1 | 4/2012 | James et al. | |
| 2013/0138227 A1 * | 5/2013 | Gohr et al. | 700/80 |

OTHER PUBLICATIONS

Dowell III, A.M. "Layer of protection analysis for determining safety integrity level", ISA Transactions, vol. 37, 1998, pp. 155-165.*
Timms, C. et al. "Software Tools for the Lifecycle Suport of Safety Instrumented Systems". TUV International Symposium 2006. pp. 1-14, 2006.
Fonseca, J.A. et al. "CMMI RAMS Extension Based on CENELEC Railway Standard". SAFECOMP 2005, LNCS 3688, pp. 1-12, 2005.

* cited by examiner

*Primary Examiner* — Jeffrey A Gaffin
*Assistant Examiner* — Benjamin Buss
(74) *Attorney, Agent, or Firm* — Buskop Law Group, PC; Wendy Buskop

(57) ABSTRACT

A method to build, manage, and analyze a safety instrumented model in software of safety instrumented system architecture for a safety instrumented system in a facility, with test plans. The safety instrumented system architecture comprises at least one instrumented protective function and the non-transitory computer instructions that use a software model in support of process safety lifecycle management.

57 Claims, 27 Drawing Sheets

FIGURE 1A

| | |
|---|---|
| CONNECTING A PROCESSOR TO A DATA STORAGE AND A NETWORK TO COMMUNICATE WITH AT LEAST ONE CLIENT DEVICE, WHEREIN THE CLIENT DEVICE HAS A CLIENT DEVICE PROCESSOR AND CLIENT DEVICE DATA STORAGE, AND INPUT AND OUTPUT PORTS | 2000 |
| USING COMPUTER INSTRUCTIONS TO PROVIDE A LOCATION TREE FOR EACH COMPONENT IN THE MODEL, EACH IPF, EACH ASSEMBLY, EACH ASSEMBLY GROUP AND COMBINATIONS THEREOF | 2002 |
| USING COMPUTER INSTRUCTIONS TO PROVIDE A PAGE IDENTIFIER IN THE SIS MODEL, TO DISPLAY THE MODULE OF THE SIS MODEL THAT A USER IS WITHIN AT ANY TIME ON DEMAND OR AT A PRESET TIME INTERVAL, WHICH WILL PROVIDE A HIERARCHY OF MODULES ASSOCIATED WITH THE USER LOCATION | 2003 |
| USING COMPUTER INSTRUCTIONS TO FORM A COMPONENT LIBRARY FOR A FACILITY FOR A PLURALITY OF COMPONENTS CONSISTING OF A COMPONENT IDENTIFIER, TAG NAME, COMPONENT TYPE AND EQUIPMENT TYPE | 2010 |
| USING COMPUTER INSTRUCTIONS TO PERMIT A USER TO EDIT OR REPLACE IN ANY ONE OF THE LIBRARIES, BY USING AN EDIT BUTTON IN THE LIBRARIES FOR ANY ONE COMPONENT, ASSEMBLY, VOTING INSTRUCTIONS FOR AN ASSEMBLY, ASSEMBLY GROUP, AN INSTRUMENTED PROTECTIVE FUNCTION OR COMBINATIONS THEREOF | 2012 |
| USING COMPUTER INSTRUCTIONS TO PROVIDE AN ACTUATOR TO APPLY A TAG TO ASSETS OF THE FACILITY | 2013 |
| USING COMPUTER INSTRUCTIONS TO ENABLE USERS TO ENTER A SPECIFIC COMPONENT FOR USE IN AN INSTRUMENTED PROTECTIVE FUNCTION DURING DESIGN PHASE OF A PROJECT | 2014 |
| USING COMPUTER INSTRUCTIONS TO IMPORT DATA FOR AN EXISTING FACILITY ASSET MANAGEMENT SYSTEM TO POPULATE A COMPONENT LIBRARY IN THE DATA STORAGE | 2015 |
| USING COMPUTER INSTRUCTIONS TO CREATE A REPORT IDENTIFYING DEVIATIONS BETWEEN THE FACILITY ASSET MANAGEMENT SYSTEM OF THE FACILITY AND THE IMPORTED DATA IN THE DATA STORAGE | 2016 |
| USING COMPUTER INSTRUCTIONS TO GENERATE A REPORT SHOWING IMPACT OF BYPASSING ON A RISK GAP BEING OPENED BY PLACING EQUIPMENT IN BYPASS | 2017 |
| USING COMPUTER INSTRUCTIONS TO ASSIGN A TAG NAME TO AT LEAST ONE COMPONENT IDENTIFIER WHILE ASSIGNING THE VOTING INSTRUCTION TO AT LEAST ONE ASSEMBLY IDENTIFIER AND AT LEAST ONE ASSEMBLY GROUP IDENTIFIER, CREATING THE COMPUTER GENERATED SAFETY INSTRUMENTED MODEL WITH A FUNCTIONAL SPECIFICATION AND A PHYSICAL SPECIFICATION FOR ALL OF THE INSTRUMENTED PROTECTIVE FUNCTIONS FOR A FACILITY IN REAL TIME | 2018 |
| USING COMPUTER INSTRUCTIONS TO DETERMINE FUNCTIONAL RELATIONSHIPS BETWEEN ASSEMBLY GROUPS AND ASSEMBLIES, AND CREATE A TAG BASED SOFTWARE MODEL WHICH CAN HAVE TAGS AND VOTING INSTRUCTIONS TO BE USED BETWEEN ASSEMBLY GROUPS AND ASSEMBLIES | 2019 |
| USING COMPUTER INSTRUCTIONS TO FORM AN ASSEMBLY LIBRARY FOR THE FACILITY WITH EACH ASSEMBLY HAVING ASSEMBLY IDENTIFIER; A NAME, ASSEMBLY TYPE, A LOCATION, AND A TEST INTERVAL SPECIFICATION | 2020 |

FIGURE 1B (1A)

| | |
|---|---|
| USING COMPUTER INSTRUCTIONS TO FORM AN ASSEMBLY-COMPONENT RELATIONSHIP TABLE, WHEREIN THE COMPONENT LIBRARY AND THE ASSEMBLY LIBRARY ENABLE THE ASSEMBLY-COMPONENT RELATIONSHIP TABLE TO DEPICT A RELATIONSHIP BETWEEN ONE OF THE ASSEMBLIES AND AT LEAST ONE COMPONENT USING THE COMPONENT IDENTIFIER, THE ASSEMBLY IDENTIFIER AND A PURPOSE FOR EACH COMPONENT CONNECTED TO AN ASSEMBLY IDENTIFIER | 2030 |
| USING COMPUTER INSTRUCTIONS TO INCLUDE A LOGIC SOLVER AS A COMPONENT OF THE INSTRUMENTED PROTECTIVE FUNCTIONS TO EXECUTE THE VOTING INSTRUCTIONS TO CARRY OUT THE FUNCTIONS OF THE INSTRUMENTED PROTECTIVE FUNCTIONS AND TO CARRY OUT INSTRUCTIONS TO PERMIT A USER TO EDIT OR REPLACE ANY LOGIC SOLVER | 2032 |
| USING COMPUTER INSTRUCTIONS TO MATCH THE ASSET IDENTIFIER FROM THE COMPONENT LIBRARY FOR A FACILITY TO COMPONENTS USED IN A FACILITY ASSET MANAGEMENT SYSTEM, AND TO MATCH COMPONENTS USED IN A FACILITY MAINTENANCE MANAGEMENT SYSTEM, AND COMBINATIONS THEREOF; WHEREIN THE MATCHING OF COMPONENTS MATCHES: FAILURE RATES IN THE SAFETY INTEGRITY LEVEL CALCULATIONS COMPARED TO ACTUAL FAILURE RATES RECORDED BY THE FACILITY ASSET MANAGEMENT SYSTEM OR A FACILITY MAINTENANCE MANAGEMENT SYSTEM; TEST INTERVALS IN THE SAFETY INTEGRITY LEVEL CALCULATIONS COMPARED TO ACTUAL TEST INTERVALS RECORDED BY THE FACILITY ASSET MANAGEMENT SYSTEM OR THE FACILITY MAINTENANCE MANAGEMENT SYSTEM; OR TRIP POINTS OF PARAMETERS FOR EACH ASSEMBLY COMPARED TO TRIP POINTS RECORDED BY THE FACILITY ASSET MANAGEMENT SYSTEM OR THE MAINTENANCE MANAGEMENT SYSTEM | 2033 |
| USING COMPUTER INSTRUCTIONS TO FURTHER USE THE RELATIONSHIP TABLES TO MATCH COMPONENTS FROM THE COMPONENT LIBRARY FOR A FACILITY TO COMPONENTS IN A FACILITY HISTORIAN USING THE ASSET IDENTIFIER FROM THE COMPONENT LIBRARY AND RECORDING THE MATCHED COMPONENTS, WHEREIN THE MATCHING OF COMPONENTS ADDITIONALLY VALIDATES A MEAN TIME TO REPAIR IN THE SAFETY INTEGRITY LEVEL CALCULATION AS COMPARED WITH ACTUAL UNAVAILABILITY TIME CALCULATED BY THE FACILITY HISTORIAN | 2034 |
| USING COMPUTER INSTRUCTIONS IN THE DATA STORAGE TO FORM AN ASSEMBLY GROUP LIBRARY FOR THE FACILITY USING AN ASSEMBLY GROUP IDENTIFIER, VOTING INSTRUCTIONS, AND GROUP TYPES | 2040 |
| USING COMPUTER INSTRUCTIONS TO FORM, STORE AND USE A DOCUMENT LIBRARY | 2042 |
| USING COMPUTER INSTRUCTIONS TO FORM AN ASSEMBLY GROUP - ASSEMBLY RELATIONSHIP TABLE, WHEREIN THE ASSEMBLY GROUP LIBRARY AND THE ASSEMBLY LIBRARY ENABLE THE ASSEMBLY GROUP - ASSEMBLY RELATIONSHIP TABLE TO DEPICT A RELATIONSHIP BETWEEN AT LEAST ONE ASSEMBLY GROUP AND AT LEAST ONE ASSEMBLY AND TO PROVIDE A PARAMETER FOR EACH ASSEMBLY USING AN ASSEMBLY GROUP IDENTIFIER, AN ASSEMBLY IDENTIFIER, AN ASSEMBLY PARAMETER IDENTIFIER, AND AN ASSEMBLY PARAMETER VALUE | 2050 |
| USING COMPUTER INSTRUCTIONS TO PERMIT A USER TO CHANGE THE RELATIONSHIP OF A COMPONENT TO A FUNCTION IN AN ASSEMBLY COMPONENT RELATIONSHIP TABLE USING AN EDIT BUTTON AND TO GENERATE A SAFETY REQUIREMENTS SPECIFICATION FOR THE SIS AND USING COMPUTER INSTRUCTIONS ALLOWING A USER TO EDIT THE SAFETY REQUIREMENTS SPECIFICATION FOR THE SIS | 2052 |
| USING COMPUTER INSTRUCTIONS TO FORM AN INSTRUMENTED PROTECTIVE FUNCTION LIBRARY FOR THE FACILITY HAVING INSTRUMENTED PROTECTIVE FUNCTION IDENTIFIER, AN INSTRUMENTED PROTECTIVE FUNCTION NAME; AN INPUT GROUP VOTING; AND AN OUTPUT GROUP VOTING | 2060 |

USING COMPUTER INSTRUCTIONS TO FORM AN INSTRUMENTED PROTECTIVE FUNCTION - ASSEMBLY GROUP RELATIONSHIP TABLE WHEREIN THE INSTRUMENTED PROTECTIVE FUNCTION LIBRARY AND THE ASSEMBLY GROUPS LIBRARY ENABLE THE INSTRUMENTED PROTECTIVE FUNCTION - ASSEMBLY GROUP RELATIONSHIP TABLE TO DEPICT A RELATIONSHIP BETWEEN AT LEAST ONE INSTRUMENTED PROTECTIVE FUNCTION AND AT LEAST ONE ASSEMBLY GROUP, FORMING A SAFETY INSTRUMENTED SYSTEM (SIS) WITH AT LEAST ONE INSTRUMENTED PROTECTIVE FUNCTION CREATING A REAL WORLD MODEL OF THE INSTRUMENTED PROTECTIVE FUNCTION (IPF) USING AN INSTRUMENTED PROTECTIVE FUNCTION IDENTIFIER, AN ASSEMBLY GROUP IDENTIFIER, AND A RELATIONSHIP IDENTIFIER —2070

USING COMPUTER INSTRUCTIONS TO ASSIGN AT LEAST ONE VOTING INSTRUCTION TO AT LEAST ONE ASSEMBLY IDENTIFIER AND AT LEAST ONE ASSEMBLY GROUP IDENTIFIER, CREATING THE COMPUTER GENERATED SAFETY INSTRUMENTED MODEL WITH A FUNCTIONAL SPECIFICATION AND A PHYSICAL SPECIFICATION FOR ALL OF THE INSTRUMENTED PROTECTIVE FUNCTIONS FOR A FACILITY IN REAL TIME —2080

USING COMPUTER INSTRUCTIONS TO UPDATE ALL INSTANCES OF A COMPONENT, AN ASSEMBLY, AN ASSEMBLY GROUP, AN INSTRUMENTED PROTECTIVE FUNCTION, OR COMBINATIONS THEREOF SIMULTANEOUSLY AS THE UPDATE IS INPUTTED INTO THE MODEL —2082

USING COMPUTER INSTRUCTIONS TO EXECUTE SAFETY INTEGRITY LEVEL CALCULATIONS USING: A LOGIC SOLVER WITH A LOGIC SOLVER LIBRARY WHEREIN THE LOGIC SOLVER LIBRARY COMPRISES A LOGIC SOLVER IDENTIFIER, A LOGIC SOLVER LOCATION, A NAME AND A TESTING INTERVAL; A SAFETY INTEGRITY LEVEL CALCULATION ENGINE; A PLURALITY OF COMPONENTS EACH HAVING A TAG NAME WITH VOTING INSTRUCTIONS; FUNCTIONAL SPECIFICATIONS FOR EACH IPF; PHYSICAL SPECIFICATIONS FOR EACH IPF; USER ENTERED ASSUMPTIONS FOR EACH IPF; AND WHEREIN THE SIL CALCULATIONS IDENTIFIES AND VERIFIES THAT THE SIL CALCULATIONS ARE MET SIMULTANEOUSLY FOR EACH IPF PROVIDING AN AVERAGE PROBABILITY OF FAILURE ON DEMAND FOR THE IPF; AND ARCHITECTURAL CONSTRAINT REQUIREMENTS FOR THE IPF —2090

USING COMPUTER INSTRUCTIONS TO COMPARE IN REAL TIME ACTUAL SAFETY INTEGRITY LEVELS ACHIEVED AT THE FACILITY DETERMINED BY THE COMPUTER GENERATED SAFETY INSTRUMENTED MODEL TO USER SPECIFIED SAFETY INTEGRITY LEVELS AND IDENTIFY GAPS BETWEEN AN ACTUAL SAFETY INTEGRITY LEVELS AND USER SPECIFIED SAFETY INTEGRATION LEVELS FOR THE FACILITY —3000

USING COMPUTER INSTRUCTIONS TO FORM, STORE AND USE A LIBRARY OF PUBLICATIONS WHICH IS VIEWABLE FOR COMPLIANCE —3002

USING COMPUTER INSTRUCTIONS TO USE THE RELATIONSHIP TABLES TO FORM A CAUSE AND EFFECT REPORT FOR A USER FOR EACH IPF —3003

USING COMPUTER INSTRUCTIONS TO INSTRUCT THE PROCESSOR TO SELECT A TEST PLAN TEMPLATE FROM THE PLURALITY OF TEST PLAN TEMPLATES USING FUNCTIONAL SPECIFICATIONS, PHYSICAL SPECIFICATIONS AND A MEMBER OF THE GROUP CONSISTING OF: AN ASSEMBLY, AN ASSEMBLY GROUP, AN INSTRUMENTED PROTECTIVE FUNCTION, OR COMBINATIONS THEREOF AND GENERATING FUNCTIONAL TEST PLANS FOR A MEMBER OF THE GROUP CONSISTING OF: AN ASSEMBLY, AN ASSEMBLY GROUP, AN INSTRUMENTED PROTECTIVE FUNCTION, AND COMBINATIONS THEREOF; USING AT LEAST ONE OF A PLURALITY OF TEST PLAN TEMPLATES STORED IN THE DATA STORAGE —3005

| | |
|---|---|
| USING COMPUTER INSTRUCTIONS TO GENERATE A SAFETY REQUIREMENTS SPECIFICATION FOR THE SIS AND USING COMPUTER INSTRUCTIONS ALLOWING A USER TO EDIT THE SAFETY REQUIREMENTS SPECIFICATION FOR THE SIS | 3006 |
| USING COMPUTER INSTRUCTIONS TO CONNECT DATA OF THE PROCESS HAZARD ANALYSIS AND LAYERS OF PROTECTION ANALYSIS TO THE SAFETY INTEGRITY LEVEL CALCULATIONS | 3007 |
| USING COMPUTER INSTRUCTIONS TO ANALYZE THE SAFETY INTEGRITY LEVEL CALCULATIONS AND AUTOMATICALLY IDENTIFY OPTIMUM PROOF TEST INTERVALS TO MEET THE SAFETY INTEGRITY LEVEL CALCULATIONS | 3008 |
| USING COMPUTER INSTRUCTIONS TO ENABLE SEARCHING FOR A SPECIFIC COMPONENT BY TAG NAME TO SUPPORT PROCESS HAZARD ANALYSIS AND LAYERS OF PROTECTION ANALYSIS | 3009 |
| USING COMPUTER INSTRUCTIONS TO ALLOW CALCULATIONS THAT ALLOW USERS TO COMPARE AT LEAST TWO POSSIBLE ARCHITECTURES FOR A SAFETY INSTRUMENTED FUNCTION | 3010 |
| USING COMPUTER INSTRUCTIONS TO ALLOW USERS TO CREATE COPIES OF A FIRST POSSIBLE ARCHITECTURE AND MAKE MODIFICATIONS OF THE FIRST POSSIBLE ARCHITECTURE | 3011 |
| USING COMPUTER INSTRUCTIONS TO ALLOW USERS TO CHANGE THE ARCHITECTURE CURRENTLY MARKED | 3012 |
| USING COMPUTER INSTRUCTIONS TO ENABLE EDITING OF CAUSE AND EFFECT DOCUMENTS, AND ALLOW THE USERS TO ADD CAUSE AND EFFECT DOCUMENTS NOT USED IN THE SAFETY INTEGRITY LEVEL CALCULATIONS | 3013 |
| USING COMPUTER INSTRUCTIONS TO CREATE PROTECTIONS LAYERS NOT USED IN LAYERS OF PROTECTION ANALYSIS OR THE SAFETY INTEGRITY LEVEL CALCULATIONS | 3014 |
| USING COMPUTER INSTRUCTIONS TO ENTER EFFECTS AS ADDITIONAL ACTIONS INTO THE FORMED COMPUTER GENERATED SAFETY INSTRUMENTED MODEL | 3015 |
| USING COMPUTER INSTRUCTIONS TO GENERATE FACILITY ACCEPTANCE TESTS USING A SOFTWARE MODEL OF PHYSICAL AND FUNCTIONAL SPECIFICATIONS | 3016 |
| USING COMPUTER INSTRUCTIONS TO GENERATE TEST PLANS FOR EACH SAFETY INSTRUMENTED FUNCTION OF THE INSTRUMENTED PROTECTIVE FUNCTION | 3017 |
| USING COMPUTER INSTRUCTIONS TO SUPPORT MANAGEMENT OF CHANGE (MOC) FOR DATA RECORDS IN THE SYSTEM BY SUPPORTING "MASTER" RECORDS, BEING UNTOUCHED WHILE "PROJECT" COPIES OF THE DATA RECORDS CAN BE EDITED AND MANIPULATED BY USERS, WHICH OPERATION CAN BE ALSO KNOWN AS "SANDBOX" | 3020 |
| USING COMPUTER INSTRUCTIONS TO CHECK EACH EDITED RECORD, MARK EACH RECORD AS CHECKED, APPROVED, AND THEN MOVE THE CHECKED AND APPROVED RECORD TO "MASTER" RECORDS | 3021 |
| USING COMPUTER INSTRUCTIONS TO SUPPORT REVISION TRACKING AND IMPACT REPORTING ON PROPOSED CHANGES | 3022 |
| USING COMPUTER INSTRUCTIONS TO ALLOW USERS TO ENTER PROPOSED CHANGES AND VIEW IMPACT REPORTS PRIOR TO APPROVING CHANGES | 3023 |

COMPONENT LIBRARY 316

| COMPONENT_ID | TAGNAME | COMPONENT TYPE | EQUIPMENT TYPE | NAME | PROCESS DESCRIPTION | ASSET ID | RECONCILING ID |
|---|---|---|---|---|---|---|---|
| 1 | PT-120 | INPUT | PRESSURE TRANSMITTER | PT-120 | SEPARATOR 1 PRESSURE | 1111331 | 778b392 |
| 2 | PS-120 | INPUT | PRESSURE SWITCH | PS-120 | SEPARATOR 1 PRESSURE | 1111332 | 779c461 |
| 3 | PT-122 | INPUT | PRESSURE TRANSMITTER | PT-122 | SEPARATOR 2 PRESSURE | 1111445 | 778b393 |
| 4 | PS-122 | INPUT | PRESSURE SWITCH | PS-122 | SEPARATOR 2 PRESSURE | 1111446 | 779d743 |
| 5 | SIS-100 | LOGIC SOLVER | INDUSTRIAL PLC | SIS-100 | SEPARATOR CONTROL | 1111447 | 780b456 |
| 6 | SDV-120 | OUTPUT | 3 WAY SOLENOID | SDV-120 | SEPARATOR 1 OUTLET VALVE | 1111551 | 785c357 |
| 7 | SDV-120 | OUTPUT | BALL VALVE | SDV-120 | SEPARATOR 1 OUTLET VALVE | 1111552 | 786b393 |
| 8 | SDV-122 | OUTPUT | 3 WAY SOLENOID | SDV-122 | SEPARATOR 2 OUTLET VALVE | 1111771 | 785d358 |
| 9 | SDV-122 | OUTPUT | BALL VALVE | SDV-122 | SEPARATOR 2 OUTLET VALVE | 1111772 | 786d394 |

FIGURE 2B

ASSEMBLY LIBRARY 308

| ASSEMBLY IDENTIFIER | NAME | ASSEMBLY TYPE | PROCESS DESCRIPTION | LOCATION | CALCULATED PFD | OVERRIDE | DOCUMENT IDENTIFIER | OVERT FAULT STATUS | TESTING INTERVAL |
|---|---|---|---|---|---|---|---|---|---|
| 10 | PS-120 | INPUT | SEPARATOR 1 PRESSURE | 10 | .0001 | FALSE | 113 | ZERO | 1 DAY |
| 20 | PS-122 | INPUT | SEPARATOR 2 PRESSURE | 10 | .001 | FALSE | 114 | ZERO | 1 HOUR |
| 30 | SDV-120 | OUTPUT | SEPARATOR 1 OUTLET VALVE | 10 | .0001 | FALSE | 115 | CLOSED | 2 HOUR |
| 40 | SDV-122 | OUTPUT | SEPARATOR 2 OUTLET VALVE | 10 | .001 | FALSE | 117 | CLOSED | 10 MINUTES |

FIGURE 2C

LOGIC SOLVER LIBRARY 309

| LOGIC SOLVER_ID 311 | LOGIC SOLVER LOCATION 313 | NAME 315 | DESCRIPTION 317 | PFD 319 | TESTING INTERVAL 321 |
|---|---|---|---|---|---|
| 1151 | 10 | CPL-1132 | COMPRESSOR 1 CONTROL PANEL | .000001 | 36 |
| 1152 | 10 | CPL-113 | COMPRESSOR 2 CONTROL PANEL | .000001 | 36 |
| 101 | 10 | SIS-17 | SEPARATOR 1 SAFETY PANEL | .000001 | 12 |
| 102 | 10 | SIS-18 | SEPARATOR 2 SAFETY PANEL | .000001 | 12 |

FIGURE 2D

ASSEMBLY - COMPONENT RELATIONSHIP TABLE 300

| ASSEMBLY_ID 302 | COMPONENT_ID 304 | PURPOSE 306 | LOGIC SOLVER 307 |
|---|---|---|---|
| 10 | 1 | SENSOR | NULL |
| 10 | 2 | INTERFACE | 101 |
| 20 | 3 | SENSOR | NULL |
| 20 | 4 | INTERFACE | 102 |
| 30 | 6 | INTERFACE | 101 |
| 30 | 7 | FINAL ELEMENT | NULL |
| 40 | 8 | INTERFACE | |
| 40 | 9 | FINAL ELEMENT | |

FIGURE 2E

ASSEMBLY GROUP LIBRARY — 342

| ASSEMBLY_GROUP_ID (344) | NAME (346) | VOTING INSTRUCTION (348) | TEST INTERVAL (349) | CALCULATED ASSEMBLY GROUP FAILURE (351) | DOCUMENT ID (331) | GROUP TYPE (360) |
|---|---|---|---|---|---|---|
| 100 | TEST SEPARATOR PRESSURE | 2oo2 | 12 | .0001 | 114 | INPUT |
| 200 | TEST SEPARATOR INLET | 1oo2 | 12 | .001 | 115 | OUTPUT |

FIGURE 2F

ASSEMBLY GROUP - ASSEMBLY RELATIONSHIP TABLE — 332

| ASSEMBLY_GROUP_ID (344) | ASSEMBLY_ID (302) | ASSEMBLY PARAMETER_ID (352) | ASSEMBLY PARAMETER VALUE (356) | ASSEMBLY PARAMETER UNIT (358) |
|---|---|---|---|---|
| 100 | 10 | 11 | 150 | PSIG |
| 100 | 20 | 12 | 150 | PSIG |
| 200 | 30 | 13 | DEN | DEN |
| 200 | 40 | 14 | DEN | DEN |

FIGURE 3A

INSTRUMENTED PROTECTIVE FUNCTION (IPF) LIBRARY 372

| IPF_ID 374 | NAME 376 | INPUT GROUP VOTING 378 | OUTPUT GROUP VOTING 380 | DOCUMENT ID 331 | CALCULATED INSTRUMENTED PROTECTIVE FUNCTION PROBABILITY OF FAILURE 381 | ACTUATOR TO PERMIT OVERRIDE 383 |
|---|---|---|---|---|---|---|
| 1000 | TEST SEPARATOR HIGH PRESSURE INTERLOCK | 1oo1 | 1oo1 | 113 | .0048 | FALSE |
| 1010 | TEST SEPARATOR HIGH LEVEL INTERLOCK | 1oo2 | 1oo2 | 114 | .00067 | FALSE |
| 1020 | GLYCOL HEATER HIGH TEMP SHUTDOWN | 1oo2 | 1oo2 | 115 | .0035 | FALSE |
| 1030 | GLYCOL HEATER LOSS OF FLAME INTERLOCK | 1oo4 | 1oo2 | 117 | .0008 | TRUE |

FIGURE 3B

INSTRUMENTED PROTECTIVE FUNCTION (IPF) - ASSEMBLY GROUP RELATIONSHIP TABLE 362

| IPF_ID 374 | ASSEMBLY GROUP_ID 344 | RELATIONSHIP_ID 375 | ADDITIONAL ACTION 386 |
|---|---|---|---|
| 1000 | 100 | 10001 | FALSE |
| 1000 | 200 | 10001 | FALSE |
| 1010 | 500 | 10001 | TRUE |
| 1010 | 510 | 10002 | TRUE |
| 1010 | 520 | 10003 | FALSE |
| 1010 | 530 | 10004 | TRUE |
| 1020 | 550 | 10004 | TRUE |
| 1020 | 551 | 10004 | FALSE |
| 1020 | 552 | 10005 | FALSE |

FIGURE 3C

DOCUMENT LIBRARY 299

| DOCUMENT_ID 331 | DOCUMENT TYPE 353 | DOCUMENT NAME 355 | DOCUMENT DESCRIPTION 357 |
|---|---|---|---|
| 114 | CAUSE AND EFFECT | SEPARATOR 1 CAUSE AND EFFECT | INLET SEPARATOR 1 CAUSE AND EFFECT |
| 115 | CAUSE AND EFFECT | SEPARATOR 2 CAUSE AND EFFECT | INLET SEPARATOR 2 CAUSE AND EFFECT |
| 116 | CAUSE AND EFFECT | COMPRESSOR 1 CAUSE AND EFFECT | COMPRESSOR 1 CAUSE AND EFFECT |
| 117 | CAUSE AND EFFECT | COMPRESSOR 2 CAUSE AND EFFECT | COMPRESSOR 2 CAUSE AND EFFECT |

FIGURE 3D

LIBRARY OF PUBLICATIONS 301

| STATUTES 290 | INDUSTRY STANDARDS 291 | NATIONAL REGULATIONS 292 | BUSINESS OWNER SPECIFIC POLICIES 293 |
|---|---|---|---|
| 35 USC 101 | IEC - 69205 | 37 CFR 25.1 | DO NOT USE HITACHI VALUES |

FIGURE 5

| | | | | | | | | | | | | | | | |
|---|---|---|---|---|---|---|---|---|---|---|---|---|---|---|---|
500 — CUSTOMER: AE2 GENERIC
502 — LOCATION: AE2 GENERIC
504 — PROJECT: DEMO
505 — NAME: CE GENERIC 01
506 — TITLE: MODULE 01 - INLET MANIFOLD
508 — REVISION: 0
510 — DATE: 06/10/2010
512 — DRAWING NUMBER: NOT ASSIGNED
514 — GENERAL NOTES:
DENOTE TAGS

516 — CAUSES
518 — EFFECTS

542 — SIL NUM
544 — EQUIP
546 — ACTION
548 — TAG
550 — DESCRIPTION
552 — NOTES
554 — RC
556 — P&ID

528 — DESCRIPTION
530 — TYPE
532 — TRIP SP
534 — UNITS
536 — IN/DEC
538 — DELAY
539 — VOTING
540 — IPF

520 — P&ID
522 — RC
524 — NOTES
526 — TAG 558, 560

| P&ID | RC | NOTES | TAG | DESCRIPTION | TYPE | TRIP SP | UNITS | IN/DEC | DELAY | VOTING | IPF | SIL NUM | 1 | 2 | 3 | 4 | 5 | 6 |
|---|---|---|---|---|---|---|---|---|---|---|---|---|---|---|---|---|---|---|
| | | | | | | | | | | | | 1 | C | C | C | C | C | C |
| | | | | | | | | | | | | 2 | C | C | C | C | C | C |
| | | | | | | | | | | | | 3 | | | | | | |
| | | | | | | | | | | | | 4 | | | | | | |

| (logo) | Assembly Test Plan for LS-182 | |
|---|---|---|
| | *721* | *724* |

Facility | Assembly Name | Test Plan Name
---|---|---
AE Solutions-Safety Lifecycle Management-North America-AK-Anchorage Facility1(Anchorage Office Facility1) | LS-182 | Procedure_High Level Non Bridle Tank Level
Module | | |
Anchorage Facility1 | | |

726
Process Description
Test Separator High Level

728

| Test Plan Status | Approved By | Approval Date | Comp Tag Name | Comp Name | Fail Mode |
|---|---|---|---|---|---|
| ASBUILT | None | 7/4/2010 12:00 AM | LS-182 | LS-182 | |

730
Work Requirements

| Required Permits | Policy & Specifications | Personnel | Tools & Instruments |
|---|---|---|---|
| Defeated Safety Device Log | Safety Handbook | Control Room Op | Field Radios |
| | Failure Classification Specification | I&T | Test Pressure Gauge |
| | | | Process Pressure Gauges (2) |

731

732
Drawings and Documents for Reference

| DRAWINGS | | DOCUMENTS | |
|---|---|---|---|
| Drawing Type | Drawing No | Document Type | Document No |
| P&ID | MI-0005-001 | C&E | CE_GEN1_54 |
| MI-0005-001 | | Module 71 | |

734
Assembly Parameters/Threshold Limits

| Parameter Type | Value | Lower Limit | Upper Limit | Units | Approach | Logic Action | As Found |
|---|---|---|---|---|---|---|---|
| LSHH | 48 | 45 | 51 | IN | Inc | | |
| Type Effect | Type Alarm | Alarm Name | | Alarm Tag | | Alarm Point | As Left |
| Trip | | | | | | | |

736
Comments about assembly LS-182:
Test Separator High Level

738
Test Results
If the device passes the test, place a check in the box under PASS below. If the device fails the test, place a check in the box under FAIL SAFE or FAIL DANGEROUS below, and record the classification code for the failure in Fail Code box. See the Failure Classification Specification document in the Policies and Specifications of the Test Requirements section above for the defined fail codes.

| Parameter Type | PASS | FAIL SAFE | FAIL DANGEROUS | FAIL CODE | Field Notes: |
|---|---|---|---|---|---|

| | | | | | |
|---|---|---|---|---|---|
| LSHH | ☐ | ☐ | ☐ | | |
| Alarm | | | | | |
| | ☐ | ☐ | ☐ | | |

| TEST PERSONNEL SIGN-OFF ||| TEST PROCEDURE APPROVAL |||
|---|---|---|---|---|---|
| Department | Test Person | Test Date | Department | Verifing Person | Verifi Date |
| I&T | I&T | mm/dd/yyyy | Operations | Control Room Op | mm/dd/yyyy |
| | | | | | |

Detail Information and Steps to Execute

| Task | Step | Staff | √ | Work Method Steps |
|---|---|---|---|---|
| | | | | Procedure_High Level Non Bridle Tank Level - Work Methods for Testing: LS-182 |
| 1 | | | | PRE-TEST - |
| | 1 | | ☐ | Obtain the appropriate permits for the testing and provide the proper notifications to operating personnel regarding the testing, any special requirements, and subsequent alarms that may be generated. |
| | 2 | | ☐ | Verify that any special safety procedures associated with testing or the actions required during testing have been identified and are being followed. |
| | 3 | | ☐ | Verify any required personal protection equipment (PPE) required for the testing is available and in good condition. |
| 3 | | | | TEST - |
| | 1 | | ☐ | Coordinate and communicate with operations to install the bypasses (software, hardware switches, jumpers, etc.,) listed in the Trip Prevention Details in the document section if required in order to prevent process upset upon trip. |
| | 2 | | ☐ | Record the method used to verify the state change below. (IT) Verification Method: LS-182 |

| Tester Comments - Additional Steps | Observed Deficiencies and Corrective Actions |
|---|---|
| | |
| | |
| | |

Facility Asset/Maintenance Management System Table — 800

| Tag Name | Field Trip Point | Field Trip Units | Test Date | Test Result | Interval (Since Last Test) |
|---|---|---|---|---|---|
| PS-120 | 140 | PSIG | 1/12/2007 | Pass | 0 |
| PS-120 | 140 | PSIG | 1/12/2008 | Fail | 12 |
| PS-120 | 145 | PSIG | 11/13/2009 | Pass | 11 |
| PS-120 | 145 | PSIG | 1/13/2010 | Pass | 14 |

Failure Rate = 1/ 26280 hr — 850

FIGURE 8B

Assembly Data Used for SIL Cal Table — 826

| Assembly_Id | Tag Name | ParameterID | Trip Point | Trip Units | Test Interval (Months) | Failure Rate |
|---|---|---|---|---|---|---|
| 10 | PS-120 | 11 | 150 | PSIG | 12 | 1/32,000 hr |
| 20 | PS-122 | 12 | 150 | PSIG | 12 | 1/32,000 hr |
| 30 | SDV-120 | 13 | DEN | | 12 | 1/24,000 hr |
| 40 | SDV-122 | 14 | DEN | | 12 | 1/24,000 hr |

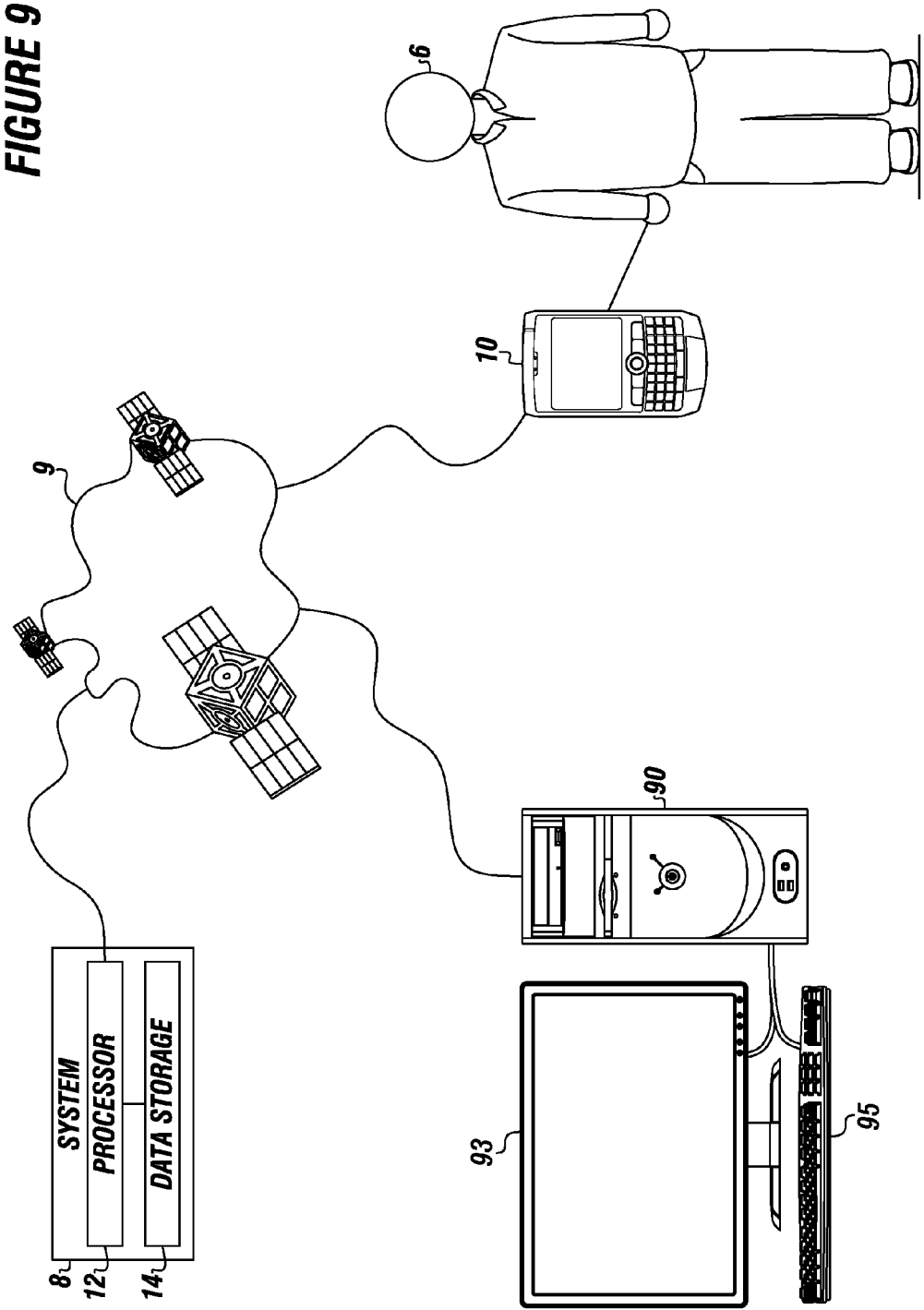

FIGURE 10A

| DATA STORAGE | 14 |
|---|---|
| COMPUTER INSTRUCTIONS FOR FORMING A COMPONENT LIBRARY | 16 |
| COMPUTER INSTRUCTIONS FOR FORMING AN ASSEMBLY LIBRARY | 18 |
| COMPUTER INSTRUCTIONS FOR FORMING AN ASSEMBLY-COMPONENT RELATIONSHIP TABLE | 22 |
| COMPUTER INSTRUCTIONS FOR FORMING AN ASSEMBLY GROUP LIBRARY | 26 |
| COMPUTER INSTRUCTIONS FOR FORMING AN ASSEMBLY GROUP - ASSEMBLY RELATIONSHIP TABLE | 30 |
| COMPUTER INSTRUCTIONS FOR FORMING, STORING AND USING THE DOCUMENT LIBRARY | 31 |
| COMPUTER INSTRUCTIONS FOR FORMING A LIBRARY OF INSTRUMENTED PROTECTIVE FUNCTIONS (IPF) | 32 |
| COMPUTER INSTRUCTIONS TO FORM, STORE AND USE A LIBRARY OF PUBLICATIONS | 33 |
| COMPUTER INSTRUCTIONS FOR FORMING AN INSTRUMENTED PROTECTIVE FUNCTION (IPF) - ASSEMBLY GROUP RELATIONSHIP TABLE | 34 |
| COMPUTER INSTRUCTIONS FOR ANALYZING FUNCTIONAL RELATIONSHIPS BETWEEN ASSEMBLY GROUPS AND ASSEMBLIES | 35 |
| COMPUTER INSTRUCTIONS FOR CREATING A TAG BASED MODEL WITH TAGS AND VOTING INSTRUCTIONS | 36 |
| COMPUTER INSTRUCTIONS IN THE DATA STORAGE TO ASSIGN AT LEAST ONE VOTING INSTRUCTION TO AT LEAST ONE ASSEMBLY IDENTIFIER AND AT LEAST ONE ASSEMBLY GROUP IDENTIFIER, CREATING THE COMPUTER GENERATED SAFETY INSTRUMENTED MODEL WITH A FUNCTIONAL SPECIFICATION AND A PHYSICAL SPECIFICATION FOR ALL OF THE INSTRUMENTED PROTECTIVE FUNCTIONS (IPF) FOR A FACILITY IN REAL TIME | 37 |
| COMPUTER INSTRUCTIONS TO PROVIDE AN ACTUATOR TO APPLY A TAG TO ASSETS OF THE FACILITY | 39 |
| COMPUTER INSTRUCTIONS FOR ADDING A FUNCTIONAL SPECIFICATION OF THE INSTRUMENTED PROTECTIVE FUNCTION (IPF) FOR THE FACILITY IN REAL TIME, WHEREIN REAL TIME CAN BE A UNIT OF TIME THAT CAN BE LESS THAN 14 CALENDAR DAYS | 42 |
| COMPUTER INSTRUCTIONS FOR EXECUTING SIL CALCULATIONS THAT USE PHYSICAL SPECIFICATIONS, VOTING INSTRUCTIONS, AND TEST INTERVAL SPECIFICATIONS TO DETERMINE AN AVERAGE PROBABILITY OF FAILURE ON DEMAND FOR EACH INSTRUMENTED PROTECTIVE FUNCTION (IPF) | 46 |
| COMPUTER INSTRUCTIONS TO COMPARE IN REAL TIME ACTUAL SAFETY INTEGRITY LEVELS ACHIEVED AT THE FACILITY DETERMINED BY THE COMPUTER GENERATED SAFETY INSTRUMENTED MODEL TO USER SPECIFIED SAFETY INTEGRITY LEVELS AND IDENTIFY GAPS BETWEEN AN ACTUAL SAFETY INTEGRITY LEVELS AND USER SPECIFIED SAFETY INTEGRATION LEVELS FOR THE FACILITY | 47 |

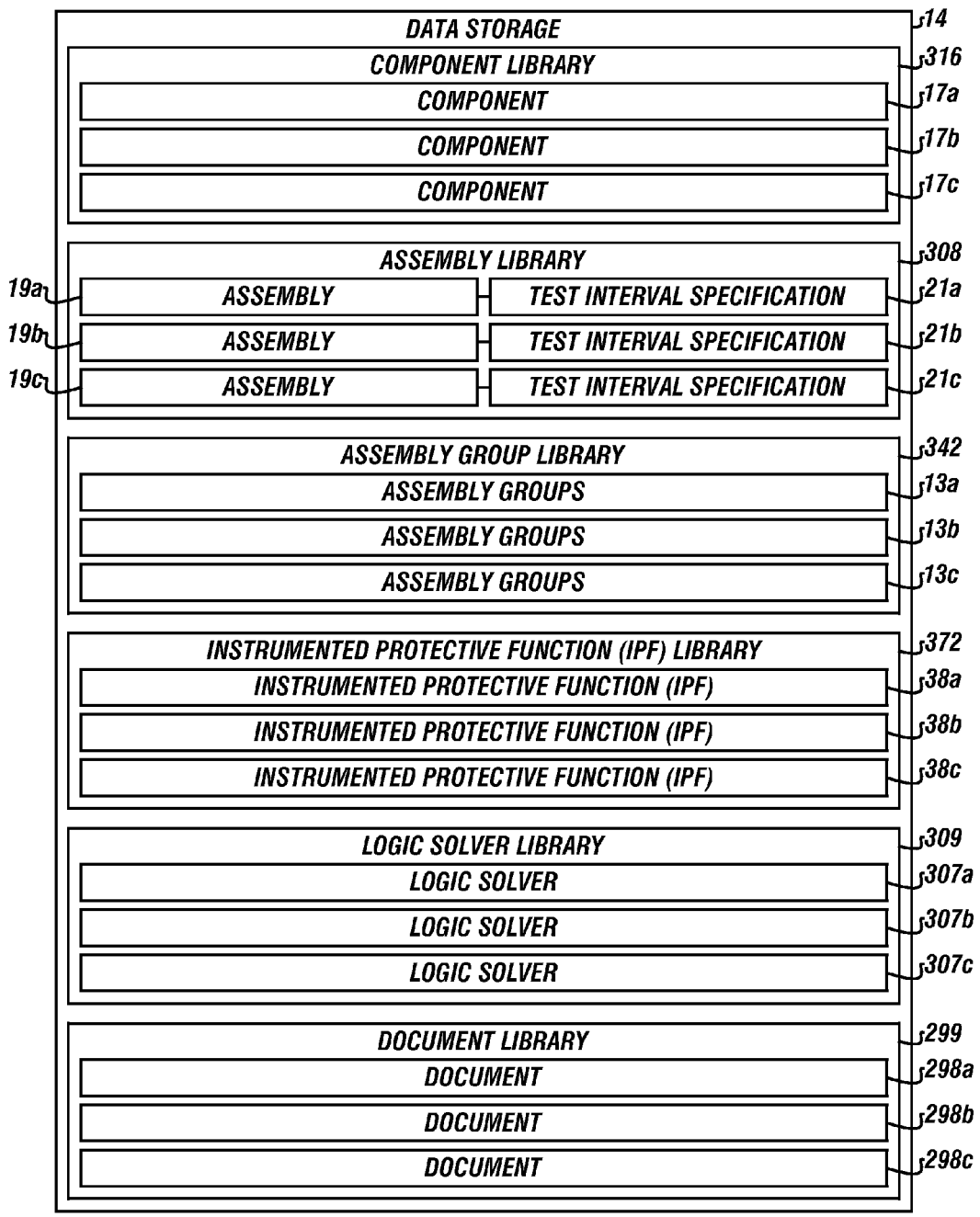

| | |
|---|---|
| COMPUTER INSTRUCTIONS TO GENERATE FACILITY ACCEPTANCE TESTS USING A SOFTWARE MODEL OF PHYSICAL AND FUNCTIONAL SPECIFICATIONS | 1326 |
| SOFTWARE MODEL OF PHYSICAL AND FUNCTIONAL SPECIFICATIONS | 1327 |
| COMPUTER INSTRUCTIONS TO GENERATE SITE ACCEPTANCE TESTS USING THE SOFTWARE MODEL OF PHYSICAL AND FUNCTIONAL SPECIFICATIONS | 1328 |
| COMPUTER INSTRUCTIONS TO GENERATE FUNCTIONAL TEST PLANS FOR EACH SAFETY INSTRUMENTED FUNCTION OF THE INSTRUMENTED PROTECTIVE FUNCTION | 1329 |
| COMPUTER INSTRUCTIONS TO GENERATE A CRITICAL ALARM LIST INCLUDING RISK RANKING OF HAZARDS TO WHICH ALARMS APPLY | 1330 |
| COMPUTER INSTRUCTIONS TO GENERATE A REPORT OF TEST PERFORMANCE FOR CRITICAL ALARMS | 1331 |
| COMPUTER INSTRUCTIONS TO GENERATE A REPORT SHOWING IMPACT OF BYPASSING ON A RISK GAP BEING OPENED BY PLACING EQUIPMENT IN BYPASS | 1332 |
| COMPUTER INSTRUCTIONS TO CATEGORIZE FAILURES FROM FAILURE RATE ANALYSIS AND PROVIDE STATISTICALLY ANALYZED FAILURE RATES TO BE USED IN SAFETY INTEGRITY LEVEL CALCULATIONS | 1333 |
| COMPUTER INSTRUCTIONS TO ALLOW USERS TO SELECT WHICH SET OF RELIABILITY DATA THEY WANT TO USE | 1334 |
| RELIABILITY LIBRARY | 1335 |
| COMPUTER INSTRUCTIONS AND SYSTEM ARCHITECTURE TO SUPPORT MANAGEMENT OF CHANGE (MOC) OF DATA RECORDS | 1336 |
| COMPUTER INSTRUCTIONS THAT PERMIT A USER TO CHANGE ANY ONE COMPONENT, ONE ASSEMBLY, ONE ASSEMBLY GROUP, OR COMBINATIONS THEREOF OR THE VOTING INSTRUCTIONS OF A TAG BASED SOFTWARE MODEL | 1338 |
| COMPUTER INSTRUCTIONS THAT PROVIDE A CONNECTION TO TAG BASED ASSETS OF THE FACILITY THAT ALLOWS TRANSFER OF DATA FROM TAG BASED ASSETS TO THE DATA STORAGE ASSOCIATED WITH THE PROCESSOR | 1340 |
| COMPUTER INSTRUCTIONS TO ASSIGN A TAG NAME TO AT LEAST ONE COMPONENT IDENTIFIER WHILE ASSIGNING THE VOTING INSTRUCTION TO AT LEAST ONE ASSEMBLY IDENTIFIER AND AT LEAST ONE ASSEMBLY GROUP IDENTIFIER, CREATING THE COMPUTER GENERATED SAFETY INSTRUMENTED MODEL WITH A FUNCTIONAL SPECIFICATION AND A PHYSICAL SPECIFICATION FOR ALL OF THE INSTRUMENTED PROTECTIVE FUNCTIONS (IPF) FOR A FACILITY IN REAL TIME | 1341 |
| COMPUTER INSTRUCTIONS TO USE RELATIONSHIP TABLES AND LIBRARIES TO FORM A CAUSE AND EFFECT REPORT | 1342 |

*FIGURE 13C*

METHOD TO BUILD, ANALYZE AND MANAGE A REAL WORLD MODEL IN SOFTWARE OF A SAFETY INSTRUMENTED SYSTEM ARCHITECTURE FOR SAFETY INSTRUMENTED SYSTEMS IN A FACILITY

CROSS REFERENCE TO RELATED APPLICATIONS

The present application is a Continuation in Part of U.S. patent application Ser. No. 13/251,051, filed on Sep. 30, 2011, entitled "SYSTEM TO BUILD, ANALYZE AND MANAGE A REAL WORLD MODEL IN SOFTWARE OF A SAFETY INSTRUMENTED SYSTEMS IN A FACILITY," issued as U.S. Pat. No. 8,521,676 on Aug. 27, 2013, which claims priority to U.S. Provisional Patent Application Ser. No. 61/388,423 and U.S. Provisional Patent Application Ser. No. 61/388,437, both which were filed on Sep. 30, 2010. These references are incorporated herein in their entirety.

FIELD

The present embodiments generally relate to a method to generate, manage, analyze, or combinations thereof, a real world model in software of a safety instrumented system (SIS) architecture for safety instrumented systems in a facility.

BACKGROUND

A need exists for a method that can target risk reduction requirements versus achieved results from safety integrity level (SIL) calculations for a facility having a hazard and risk assessment and an associated layer of protective analysis (LOPA).

A further need exists for a method that compares test intervals assumed in safety integrity level (SIL) calculations to actual test completions being recorded.

Another need exists for a method which can compare device failure rates assumed in safety integrity level (SIL) calculations versus actual failure rates recorded.

A need exists for a method that provides a downtime estimate for repair on devices, software, or processes, or even an entire facility in safety integrity level (SIL) calculations and compares that downtime estimate to actual availability with actual time in a bypass situation.

A need exists for a method that identifies demand sources and causes named in at least a layer of protective analysis (LOPA), and compares the identified demand sources to actual demands as recorded.

A need exists for a method that identifies safety instrumented system (SIS) lifecycle phases required for projects versus phases of completed projects on a real time dashboard for multiuser viewing.

The present embodiments meet these needs.

BRIEF DESCRIPTION OF THE DRAWINGS

The detailed description will be better understood in conjunction with the accompanying drawings as follows:

FIGS. 1A-1E depict the sequence of steps of the inventive method.

FIG. 2A depicts the component library.

FIG. 2B shows the assembly library.

FIG. 2C shows the logic solver library.

FIG. 2D depicts the assembly-component relationship table according to the method.

FIG. 2E is an embodiment of an assembly group library.

FIG. 2F is an embodiment of an assembly group-assembly relationship table.

FIG. 3A shows the instrumented protective function (IPF) library.

FIG. 3B shows an embodiment of the instrumented protective function (IPF)-assembly group relationship table.

FIG. 3C shows a document library according to the invention.

FIG. 3D shows the library of publications used with the method.

FIG. 5 shows an embodiment of a cause and effect report.

FIGS. 7A and 7B are an example of a test plan template that has been modified to a functional test plan.

FIG. 8A shows the facility asset/maintenance management system table.

FIG. 8B shows the assembly data used for a safety integrity level (SIL) calculations table.

FIG. 9 depicts an overview of equipment usable with the method to computer generate a real world model in software of a safety instrumented system (SIS) architecture for SIS in a facility showing the different computer instructions coupled to a facility management system using a network.

FIGS. 10A-10C depict details of the data storage and computer instructions contained therein for implementing the method.

FIG. 11 is a representation of the libraries that can be stored in the data storage.

FIGS. 13A-13C depict an embodiment of the client device, which can include various additional computer instructions usable with the executive dashboard.

Figure 1E:
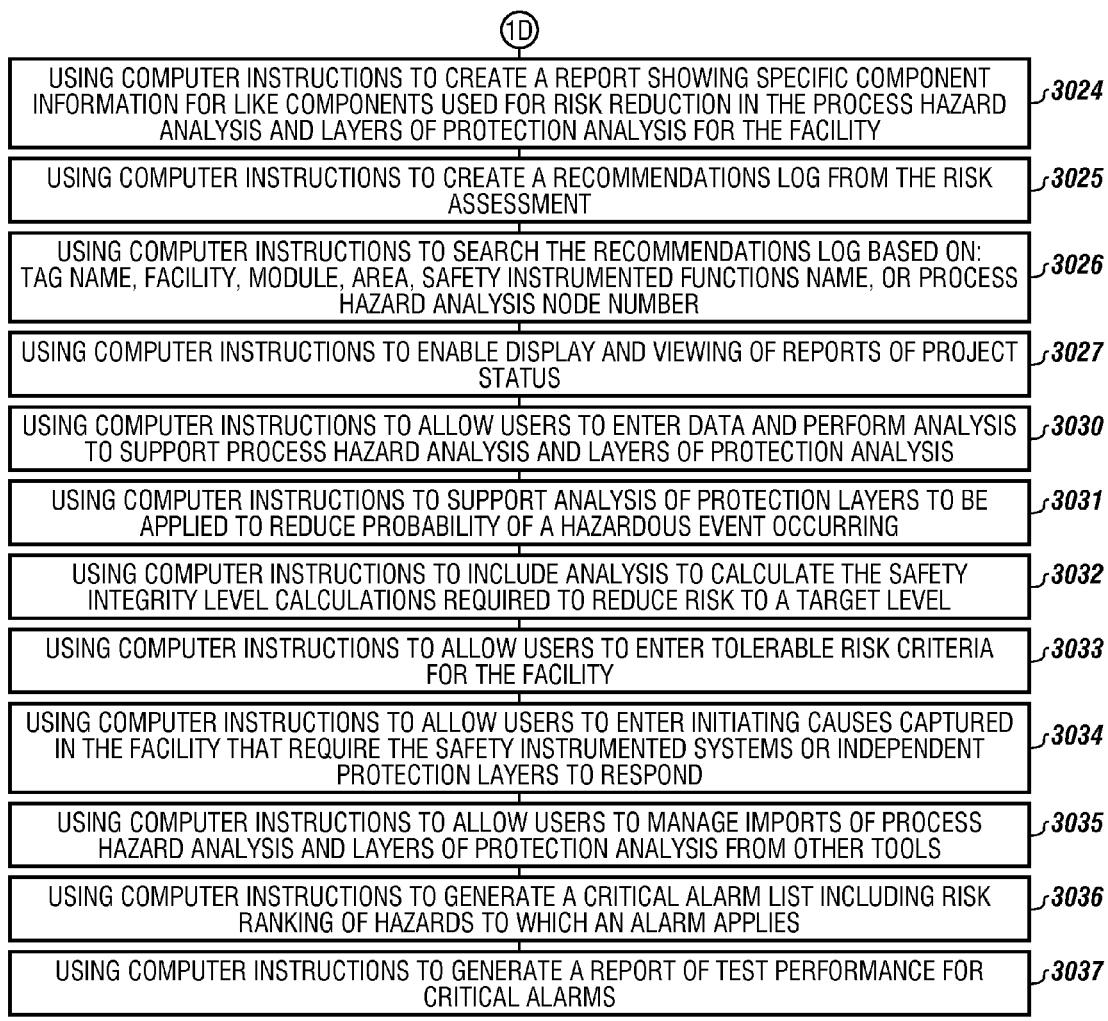

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The method helps prevent explosions in a facility by making measurements for safety device that can be used to predict the possibility of loss of containment of dangerous, volatile, and explosive and otherwise hazardous and toxic materials on a hazard by hazard basis.

The method provides a comparison of target risk reduction requirements to achieved results from safety integrity level (SIL) calculations for a facility having a hazard and risk assessment and an associated layer of protective analysis (LOPA).

The method helps prevent environmental spills by predicting when particular devices will become defective.

The method compares test intervals assumed in safety integrity level (SIL) calculations to actual test completions being recorded at a facility.

The method enables facilities to be safer for humans to work in and breathe in because the method can predict when emissions are more likely to occur or excursions that would be disastrously harmful to neighboring farms, children, and localities nearby the facility.

The method can compare device failure rates assumed in safety integrity level (SIL) calculations versus actual failure rates recorded at a facility.

The method helps prevent the loss of life or injury because the method identifies which protective layers prevent multiple permanent injuries and which protective layers prevent loss of life.

The method provides a downtime estimate for repair of devices, software, processes, or even an entire facility in safety integrity level (SIL) calculations and compares that downtime estimate to actual availability with actual time in a bypass situation.

Had this method been in place on the BP rig in the Gulf of Mexico which caused one of the largest disasters in United States history, the method could have significantly helped in identifying the blow out preventer defect due to its faulty maintenance schedule.

The method could have both (1) alerted rig operators in real time to faulty maintenance, and (2) provided documentation in real time, practically instantaneously, that the rig was late with its preventive maintenance which would have been very helpful to prevent proceeding under the faulty maintenance situation and thereby saving the 11 human lives lost and prevented spilling the millions of gallons of oil into the Gulf of Mexico.

The unique method identifies demand sources and causes named in at least a layer of protective analysis (LOPA), and compares the identified demand sources to actual demands as recorded regarding at least a portion of a facility.

The method identifies safety instrumented system (SIS) lifecycle phases required for projects versus phases of completed projects on a real time dashboard for multiuser viewing.

The present embodiments generally relate to a method to computer generate, manage, and analyze, a software model of a safety instrumented system (SIS) architecture for safety instrument systems (SIS) in a facility, such as a low oxygen shut down interlock architecture for a burner management system in a refinery.

The safety instrumented system architecture for a safety instrumented system in a facility can include at least one instrumented protective function (IPF) such as a high stack temperature interlock.

For the purpose of this application the term "instrumented protective function" (IPF) means, an instrumented protective function or other protective layer, for a component, an assembly, an assembly group or combination thereof, such as operator alarm, safety relief valve, or a basic process control interlock.

The term "an average probability of failure on demand" as used herein can refer to an average probability for either: an assembly probability of failure on demand 327 as calculated by a SIL calculation engine; a probability of failure on demand (PFD) for the logic solver, calculated assembly group failure on demand, calculated instrumented protective function probability of failure on demand, or combinations thereof.

The term "average probability of failure on demand" can refer to the probability or likelihood that the safety function, which can be a connected series of equipment or individual components of the safety function will fail to perform intended functions at the time a hazardous event occurs.

The term "functional specification" for all of the instrumented protective functions for the facility in real time refers to the logic used by the safety instrumented system (SIS) to describe the behavior required from the SIS. The functional specifications define expected changes in output states of the components used in the SIS based on current input component status.

The term "physical specification" for all of the instrumented protective functions for the facility in real time refers to the architecture of the safety instrumented system (SIS) which includes equipment redundancy, equipment types, and installation details.

The term "facility" in this application refers to a chemical plant, a refinery or another type of manufacturing facility, transport vehicles, or moveable equipment that are connected or related thereto.

The term "real time" as used herein, refers to a unit of time that can be from 1 day to 30 days, for example, 7 calendar days in order to make a new evaluation or new safety integrity level SIL calculation as required by the method.

The term "component" and "instrument" can be used interchangeably in this application.

The term "assembly" refers to one or more connected components or instruments.

The term "assembly group" refers to one or more connected assemblies.

The term "test plan" refers to one or more plans to verify that the instrumented protective functions (IPF) are performing as expected. Embodiments of the present invention can include using multiple test plans in combination to incorporate multiple IPFs to test an entire safety instrumented system (SIS).

The term "safety integrity level" (SIL) refers to a discrete level, one out of four for specifying the safety integrity requirements of a safety instrumented function to be allocated to the safety integrated system. Safety integrity level 1 (SIL) 1 has the lowest level of safety integrity; safety integrity level 4 (SIL) 4 has the highest. See, for example, the definition used in the International Electrotechnical Commission standard known as "IEC" Number 61511-1 from 2002 provides clear definitions of an SIL.

The term "architectural constraint requirements" refers to the redundancy of equipment required to achieve a desired safety integrity level (SIL). Additional redundancy may be required to reach a higher safety integrity levels and maintain instrumented protective function (IPF) architectural constraint requirement for a safety instrumented system SIS.

The term "facility historian" as used herein includes computer software and/or hardware system(s) that is connected to a logic solver (for example the basic process control system that provides continuous control of the facility equipment) that provide continuous collection of potentially large volumes of data and combine advanced data storage and compression techniques to capture and store time-series information in real time that help management evaluate a facility's process operating conditions and make performance decisions.

The method to computer generate a real world model in software can be in support of process safety lifecycle management.

Process safety lifecycle management can be a management process for monitoring and studying the integrity of pieces of equipment, procedures and processes, functions, and software that can be designed for use in a facility and to predict when these items need to be repaired, replaced, cleaned or upgraded or some similar activity to ensure they keep working in their optimum condition and most desirably according to their design specifications.

The method uses a processor and connected data storage. The processor can be a laptop or server with a processor. The processor with connected data storage can connect to a client device, which can also have processors and connected data storage to allow processing of the information from remote locations and viewing of information from remote locations.

The data storage can be an integral data storage, a jump drive capable of holding gigabytes, or a data storage at another location, remote to the location of the processor.

The method uses various non-transitory computer instructions in computer readable media in a series of steps to create a real world mathematical model for enabling compliance with various OSHA, EPA and other regulations at a facility or a production unit and for input from users connected via a network, wherein the users can be computers.

The following terms are also used, a "component library" refers to components in a production or processing facility, such as an offshore oil platform, a drill ship, a floating liquefied natural gas processing facility, a land based chemical facility, a refinery having reactors, processing lines and other operational pieces of equipment. For example, the component library can include reactor heaters, reactor pumps, valves, sensors, relays, logic solvers, connecting to a control panel to monitor the ingress and egress and the actual transformation of the chemicals in the plant. The component library can have a component identifier, a tag name, a component type, equipment type, a name, a process description, an asset identifier, and a reconciling identifier.

An "assembly library" as the term is used herein includes information on assemblies, which are connected pieces of equipment. The library can include an assembly identifier, a name, an assembly type, a process description, a location, a calculated probability of failure on demand (PFD), an override, a document identifier, and an overt fault status and a test interval for each identified assembly.

For example, in a chemical plant, an assembly can be a combination of components, such as element sensors and interposing relays that read and transmit a temperature signal to a logic solver. The test interval specification for that assembly can be every 12 months.

The term "assembly-component relationship table" is a table created using a mathematical algorithm that can associate individual components from the component library with assemblies from the assembly library and form a table cross paring at least one item from each library.

The assembly-component relationship table has an assembly identifier, a component identifier, a purpose and a logic solver.

The component library and the assembly library can enable the assembly-component relationship table to depict a relationship between one of the assemblies and at least one component and to provide a purpose for each component in each assembly. An example of a purpose might be the function of a sensor component of an assembly.

The term "assembly group library" refers to a library of assembly group identifiers, a name, a voting instruction, a test interval, a calculated assembly group failure, a document identifier and a group type.

The term "assembly group-assembly relationship table" refers to a mathematically created table using the assembly group library and the assembly library to enable the assembly group-assembly relationship table to depict a relationship between at least one assembly group and at least one assembly and to provide a parameter for each assembly. The assembly group-assembly relationship table has an assembly group identifier, an assembly identifier, an assembly parameter identifier, an assembly parameter value, and an assembly parameter unit.

The term "an instrumented protective functions (IPF) library" refers to a library containing IPF identifier, a name, an input group voting, an output group voting, a document identifier, a calculated instrumented protective function probability of failure and an actuator to permit override.

The term "an instrumented protective function (IPF)-assembly group relationship table" refers to the mathematically created table using components from the instrumented protective function library and the assembly groups library enable the instrumented protective function (IPF)-assembly group relationship table to depict a relationship between at least one instrumented protective function and at least one assembly group, forming a safety instrumented system (SIS) with at least one instrumented protective function creating a real world model of the instrumented protective function (IPF).

The term "logic solver" as used herein is a processor with data storage and computer instructions, such as a programmable logic controller (PLC) that receives input signals from field instrument, processes computer logic based on the field inputs and sends outputs to field equipment. Logic solvers are modeled using this method. The method creates a model of not only logic solvers, but also field instrumentation providing inputs and the field equipment providing outputs.

The term "logic solver library" as used herein refers to a library that includes a logic solver identifier, a logic solver location, a name, a description, a probability of failure on demand, and a testing interval.

The term "actual safety integrity levels" as used herein refers to the category of integrity level calculations based on a calculated probability of failure on demand (PFD). The probability of failure on demand is a calculated probability based on the reliability of the components and logic architecture of the assembly groups and instrumented protective functions (IPF)s.

The term "gaps" when used to refer to a difference between an actual safety integrity level and user specified safety integration level for the facility are determined by mathematically calculating a difference between a target probability of failure on demand (PFD) and an actual PFD which can also be referred to herein as "achieved probability of failure on demand."

The invention relates to a method for computer generating a safety instrumented model for managing a process safety lifecycle for a safety instrumented system (SIS) in a facility, wherein the safety instrumented model has at least one instrumented protective function (IPF).

Turning now to the Figures, FIGS. 1A-1E show the steps of the method.

The method can include connecting a processor to a data storage and a network to communicate with at least one client device, wherein the client device has a client device processor and client device data storage, and input and output ports, as shown in step 2000.

An embodiment of the method can include using computer instructions to provide a location tree for each component in the model, each IPF, each assembly, each assembly group and combinations thereof, as shown in step 2002.

An embodiment of the method can include using computer instructions to provide a page identifier in the SIS model, to display the module of the SIS model that a user is within at any time on demand or at a preset time interval, which will provide a hierarchy of modules associated with the user location, as shown in step 2003.

In embodiments of the test plan template this can be noted in the "you are here" indicator.

The method can include using computer instructions to form a component library for a facility for a plurality of components consisting of a component identifier, tag name, component type and equipment type, as shown in step 2010.

An embodiment of the method can include using computer instructions to permit a user to edit or replace in any one of the libraries, by using an edit button in the libraries for any one component, assembly, voting instructions for an assembly, assembly group, an instrumented protective function or combinations thereof, as shown in step 2012.

In an embodiment, the method can include using computer instructions to provide an actuator to apply a tag to assets of the facility, as step 2013.

In an embodiment, the method can include using computer instructions to enable users to enter a specific component for use in an instrumented protective function during design phase of a project, as step 2014.

In an embodiment, the method can include using computer instructions to import data for an existing facility asset management system to populate a component library in the data storage, as step 2015.

In an embodiment, the method can include using computer instructions to create a report identifying deviations between the facility asset management system of the facility and the imported data in the data storage, as step 2016.

In an embodiment, the method can include using computer instructions to generate a report showing impact of bypassing on a risk gap being opened by placing equipment in bypass, as step 2017.

In an embodiment, the method can include using computer instructions to assign a tag name to at least one component identifier while assigning the voting instruction to at least one assembly identifier and at least one assembly group identifier, creating the computer generated safety instrumented model with a functional specification and a physical specification for all of the instrumented protective functions for a facility in real time, as step 2018.

In an embodiment, the method can include using computer instructions to determine functional relationships between assembly groups and assemblies, and create a tag based software model which can have tags and voting instructions to be used between assembly groups and assemblies, as step 2019.

The method can include using computer instructions to form an assembly library for the facility with each assembly having assembly identifier; a name, assembly type, a location, and a test interval specification, as step 2020.

The method can include using computer instructions to form an assembly-component relationship table, wherein the component library and the assembly library enable the assembly-component relationship table to depict a relationship between one of the assemblies and at least one component using the component identifier, the assembly identifier and a purpose for each component connected to an assembly identifier, as step 2030.

In an embodiment, the method can include using computer instructions to include a logic solver as a component of the instrumented protective functions to execute the voting instructions to carry out the functions of the instrumented protective functions and to carry out instructions to permit a user to edit or replace any logic solver, as step 2032.

In an embodiment, the method can include using computer instructions to match the asset identifier from the component library for a facility to components used in a facility asset management system, and to match components used in a facility maintenance management system, and combinations thereof; wherein the matching of components matches: failure rates in the safety integrity level calculations compared to actual failure rates recorded by the facility asset management system or a facility maintenance management system; test intervals in the safety integrity level calculations compared to actual test intervals recorded by the facility asset management system or the facility maintenance management system; or trip points of parameters for each assembly compared to trip points recorded by the facility asset management system or the maintenance management system, as step 2033.

In an embodiment, the method can include using computer instructions to further use the relationship tables to match components from the component library for a facility to components in a facility historian using the asset identifier from the component library and recording the matched components, wherein the matching of components additionally validates a mean time to repair in the safety integrity level calculation as compared with actual unavailability time calculated by the facility historian, as step 2034.

In an embodiment, the method can include using computer instructions in the data storage to form an assembly group library for the facility using an assembly group identifier, voting instructions, and a group types, as step 2040.

In some embodiments, the method can include using computer instructions to form, store and use a document library, as step 2042.

The document library can include a document identifier that provide a link to the document library and document types.

Document types can be cause and effect diagram document; safety requirements specification document; layer of protective analysis document types, test plan procedures; SIL calculation modeling files; override risk assessment; and safety integrity level calculation, or combinations thereof.

The document library can include document names and document descriptions.

In embodiments, the method can include using computer instructions to form an assembly group-assembly relationship table, wherein the assembly group library and the assembly library enable the assembly group-assembly relationship table to depict a relationship between at least one assembly group and at least one assembly and to provide a parameter for each assembly using an assembly group identifier, assembly identifier, an assembly parameter identifier, and assembly parameter value.

In an embodiment, the method can include using computer instructions to permit a user to change the relationship of a component to a function in an assembly component relationship table using an edit button and to generate a safety requirements specification for the SIS and using computer instructions allowing a user to edit the safety requirements specification for the SIS, as step 2052.

In embodiments, the method can include using computer instructions to form an instrumented protective function library for the facility having instrumented protective function identifier, an instrumented protective function name; an input group voting; and an output group voting, as step 2060.

In an embodiment, the method can include using computer instructions to form an instrumented protective function (IPF)-assembly group relationship table wherein the instrumented protective function library and the assembly groups library enable the instrumented protective function (IPF)-assembly group relationship table to depict a relationship between at least one instrumented protective function and at least one assembly group, forming a safety instrumented system (SIS) with at least one instrumented protective function creating a real world model of the instrumented protective function (IPF) using an instrumented protective function identifier, an assembly group identifier, and a relationship identifier, as step 2070.

In embodiments, the method can include using computer instructions to assign at least one voting instruction to at least one assembly identifier and at least one assembly group identifier, creating the computer generated safety instrumented model with a functional specification and a physical specification for all of the instrumented protective functions for a facility in real time, as step 2080.

In an embodiment, the method can include using computer instructions to update all instances of a component, an assembly, an assembly group, an instrumented protective function, or combinations thereof simultaneously as the update is inputted into the model, as step 2082.

In embodiments, the method can include using computer instructions to execute safety integrity level calculations using: a logic solver with a logic solver library wherein the logic solver library comprises a logic solver identifier, a logic solver location, a name and a testing interval; a safety integrity level calculation engine; a plurality of components each having a tag name with voting instructions; functional specifications for each IPF; physical specifications for each IPF; user entered assumptions for each IPF; and wherein the SIL calculations identifies and verifies that the SIL calculations are met simultaneously for each IPF providing an average probability of failure on demand for the IPF; and architectural constraint requirements for the IPF, as step 2090.

In embodiments, the method can include using computer instructions to compare in real time actual safety integrity levels achieved at the facility determined by the computer generated safety instrumented model to user specified safety integrity levels and identify gaps between an actual safety integrity levels and user specified safety integration levels for the facility, as step 3000.

In an embodiment, the method can include using computer instructions to form, store and use a library of publications which is viewable for compliance, as step 3002.

The library of publications can include statutes; industry standards; national regulation; and business owner specific policies and combinations thereof.

In an embodiment, the method can include using computer instructions to use the relationship tables to form a cause and effect report for a user for each IPF, as step 3003.

In an embodiment, the method can include using computer instructions to instruct the processor to select a test plan template from the plurality of test plan templates using functional specifications, physical specifications and a member of the group consisting of: an assembly, an assembly group, an instrumented protective function, or combinations thereof and generating functional test plans for a member of the group consisting of: an assembly, an assembly group, an instrumented protective function, and combinations thereof; using at least one of a plurality of test plan templates stored in the data storage, as step 3005.

In an embodiment, the method can include using computer instructions to generate a safety requirements specification for the SIS and using computer instructions allowing a user to edit the safety requirements specification for the SIS, as step 3006.

In an embodiment, the method can include using computer instructions to connect data of the process hazard analysis and layers of protection analysis to the safety integrity level calculations, as step 3007.

In an embodiment, the method can include using computer instructions to analyze the safety integrity level calculations and automatically identify optimum proof test intervals to meet the safety integrity level calculations, as step 3008.

In an embodiment, the method can include using computer instructions to enable searching for a specific component by tag name to support process hazard analysis and layers of protection analysis, as step 3009.

In an embodiment, the method can include using computer instructions to allow calculations that allow users to compare at least two possible architectures for a safety instrumented function, as step 3010.

In an embodiment, the method can include using computer instructions to allow users to create copies of a first possible architecture and make modifications of the first possible architecture, as step 3011.

In an embodiment, the method can include using computer instructions to allow users to change the architecture currently marked, as step 3012.

In an embodiment, the method can include using computer instructions to enable editing of cause and effect documents, and allow the users to add cause and effect documents not used in the safety integrity level calculations, as step 3013.

In an embodiment, the method can include using computer instructions to create protections layers not used in layers of protection analysis or the safety integrity level calculations, as step 3014.

In an embodiment, the method can include using computer instructions to enter effects as additional actions into the formed computer generated safety instrumented model, as step 3015.

In an embodiment, the method can include using computer instructions to generate facility acceptance tests using a software model of physical and functional specifications, as step 3016.

In an embodiment, the method can include using computer instructions to generate test plans for each safety instrumented function of the instrumented protective function, as step 3017.

In an embodiment, the method can include using computer instructions to support management of change (MOC) for data records in the system by supporting "Master" records, being untouched while "Project" copies of the data records can be edited and manipulated by users, which operation can be also known as "Sandbox," as step 3020.

In an embodiment, the method can include using computer instructions to check each edited record, mark each record as checked, approved, and then move the checked and approved record to "Master" records, as step 3021.

In an embodiment, the method can include using computer instructions to support revision tracking and impact reporting on proposed changes, as step 3022.

In an embodiment, the method can include using computer instructions to allow users to enter proposed changes and view impact reports prior to approving changes, as step 3023.

In an embodiment, the method can include using computer instructions to create a report showing specific component information for like components used for risk reduction in the process hazard analysis and layers of protection analysis for the facility, as step 3024.

In an embodiment, the method can include using computer instructions to create a recommendations log from the risk assessment, as step 3025.

In an embodiment, the method can include using computer instructions to search the recommendations log based on: tag name, facility, module, area, safety instrumented functions name, or process hazard analysis node number, as step 3026.

In an embodiment, the method can include using computer instructions to enable display and viewing of reports of project status, as step 3027.

In an embodiment, the method can include using computer instructions to allow users to enter data and perform analysis to support process hazard analysis and layers of protection analysis, as step 3030.

In an embodiment, the method can include using computer instructions to support analysis of protection layers to be applied to reduce probability of a hazardous event occurring, as step 3031.

In an embodiment, the method can include using computer instructions to include analysis to calculate the safety integrity level calculations required to reduce risk to a target level, as step 3032.

In an embodiment, the method can include using computer instructions to allow users to enter tolerable risk criteria for the facility, as step 3033.

In an embodiment, the method can include using computer instructions to allow users to enter initiating causes captured in the facility that require the safety instrumented systems or independent protection layers to respond, as step 3034.

In an embodiment, the method can include computer instructions to allow users to manage imports of process hazard analysis and layers of protection analysis from other tools, as step 3035.

In an embodiment, the method can include using computer instructions to generate a critical alarm list including risk ranking of hazards to which an alarm applies, as step 3036.

In an embodiment, the method can include using computer instructions to generate a report of test performance for critical alarms, as step 3037.

FIGS. 2A-2F depict a component library, an assembly library, a logic solver library, an assembly-component relationship table, an assembly group library, and an assembly group-assembly relationship table that are used according to the method, FIG. 2A shows the component library 316, which can contain the following information: a component identifier 304 for components in the assembly for identifying the component in the method; a tag name 320 for identifying the instrument in a drawing; a component type 322 for describing a specific installation and operation at that specific installation; and equipment type 324.

The component library 316 can further contain a name 335 representing an instance of equipment type; a process description 337; an asset identifier 339 for identifying the instrument with a third party system to track the instrument location for maintenance, additional use, cost of ownership, and for use in inventory management. In one or more embodiments, the asset identifier can be a serial number.

The component library 316 can further contain a means for reconciling identifier 341 for component lists with third party software related to the instrument; and combinations thereof.

FIG. 2B shows the assembly library 308, which can include: the assembly identifier 302 for the assembly for use in the library and a name 312 of the assembly representing at least one component.

The assembly library 308 can further include an assembly type 314 describing a specific installation and operation at that specific installation; a process description 323 of the assembly, such as separator pressure for example; and a location 325 of the assembly in a facility.

The assembly library 308 can further include an assembly probability of failure on demand, shown here as a calculated PFD 327 as calculated by a safety integrity level SIL calculation engine and an assembly based actuator to permit override 329 of the safety integrity level SIL calculation engine and allow manual entry of a probability of failure for that assembly.

The assembly library 308 can further include the document identifier 331 for providing a link to the document library, an overt fault status 333 that can describe a state to transition an assembly to when an overt fault is recognized, and testing intervals 349.

FIG. 2C shows a logic solver library 309, which can include: a logic solver identifier 311; a logic solver location 313; and a name 315 of a logic solver.

The logic solver library can further include a description 317 of the logic solver; a probability of failure on demand, shown here as PFD 319 for the logic solver; and a testing interval 321 to define a required test.

FIG. 2D shows the assembly-component relationship table 300 which can have an assembly identifier 302, the component identifier 304, a purpose 306, and the logic solver 307.

In one or more embodiments, computer instructions can be used to form the assembly group library for the facility in the data storage.

For example, the assembly group can be two temperature sensing assemblies for a furnace. For example another assembly group can be two fuel gas block valves assembly for the same furnace.

Each assembly group can have a unique identifier and contain one or more assemblies. Each assembly group can be displayed to a user of the method as a description.

In this Figure, the assembly identifier 302 can have a value, such as 10 extracted from the assembly library. The purpose 306 can have a value, such as sensor. The logic solver 307 can have a logic solver identifier extracted from the logic solver library.

FIG. 2E shows the assembly group library 342 which can include: an assembly group identifier 344; a name 346 of each assembly group; the voting instruction 348 of each assembly group; and a test interval 349, which can be user entered assumption for an assembly group.

The assembly group library can further include a calculated assembly group failure on demand 351; the document identifier 331 associated with assembly group, and an assembly group type 360.

FIG. 2F provides a detailed depiction of an assembly group-assembly relationship table 332.

In one or more embodiments, computer instructions can be used to form an assembly group-assembly relationship table in the data storage.

These computer instructions can compile data from the assembly group library and the assembly library and create the assembly group-assembly relationship table depicting a relationship between at least one assembly group and at least one assembly and providing a parameter for each assembly.

The assembly group-assembly relationship table 332 can include: an assembly group identifier 344; the assembly identifier 302; an assembly parameter identifier 352; an assembly parameter value 356; and a parameter unit 358.

As shown in this Figure, the assembly group identifier 344 column can have a value, such as 100, extracted from the assembly group library. The assembly identifier 302 column can have a value, such as 10, extracted from the assembly library. The assembly parameter identifier 352 column can have a value, such as 11, extracted from the assembly group library. The assembly parameter value 356 column can have a value, such as 150. The assembly parameter unit 358 column can have a unit, such as PSIG.

FIG. 3A shows an embodiment of the instrumented protective function (IPF) library 372, which can include: a protective layer identifier 374; a name of an instrumented protective function (IPF); an input group voting instruction 378; and an output group voting instruction 380.

The instrumented protective function (IPF) library 372 can also include: a calculated instrumented protective function probability of failure on demand 381 and an actuator to permit override 383 of the IPF safety integrity level (SIL) calculation engine, which can allow manual entry of a probability of failure for that IPF.

An example of an instrumented protective function (IPF) can be a low charge flow on a furnace for a refinery.

FIG. 3B shows an embodiment of the instrumented protective function (IPF)-assembly group relationship table 362.

The instrumented protective function (IPF)-assembly group relationship table 362 can include: an IPF identifier 374; the assembly group identifier 344; a relationship identifier 375, which can identify the IPF to assembly group relationship identifier; and an indication that an assembly group can be functioning as an additional action 386, not included in the IPF safety integrity level SIL calculation engine.

The method creates the instrumented protective function (IPF)-assembly group relationship table which can include relationships between at least one IPF and at least one assembly group, forming a safety instrumented system (SIS) with at least one IPF, using the IPF libraries and assembly group library.

Additionally, the method can include computer instructions to compile data from the library of instrumented protective functions and assembly group library and form an instrumented protective function (IPF)-assembly group relationship table in the data storage.

FIG. 3C shows an embodiment of a created document library according to the method.

A document library 299 can include: a document identifier 331 that provides a link to the document library from another table created by the method.

The library can include an indication of document type 353, document names 355 and document descriptions 357.

Examples of document types 353 can include: cause and effect diagram documents; safety requirements specification documents; layer of protection analysis document types; test plan procedures; safety integrity level (SIL) calculation modeling files; override risk assessments; and safety integrity level calculations, and combinations thereof.

In one or more embodiments, the method can use computer instructions to create the document library, to form, store and use the document library.

FIG. 3D shows an embodiment of the library of publications according to the method.

The library of publications 301 in the data storage, can be viewable for compliance, and can include: statutes 290, such as US codes, for example, 35 USC 101; industry standards 291, such as IEC codes; national regulation 292, such as codes of federal regulation, for example 37 CRF 25.1; and business owner specific policies 293, and combinations thereof.

In embodiments, the method can use computer instructions to form, store and use the library of publications.

The instrumented protective function (IPF) library, the library of publications, the library of documents, and the assembly group library enable the instrumented protective function (IPF)-assembly group relationship table to depict the relationship between at least one IPF and at least one assembly group, forming a safety instrumented system (SIS) which can have at least one instrumented protective function (IPF).

Figure 4:
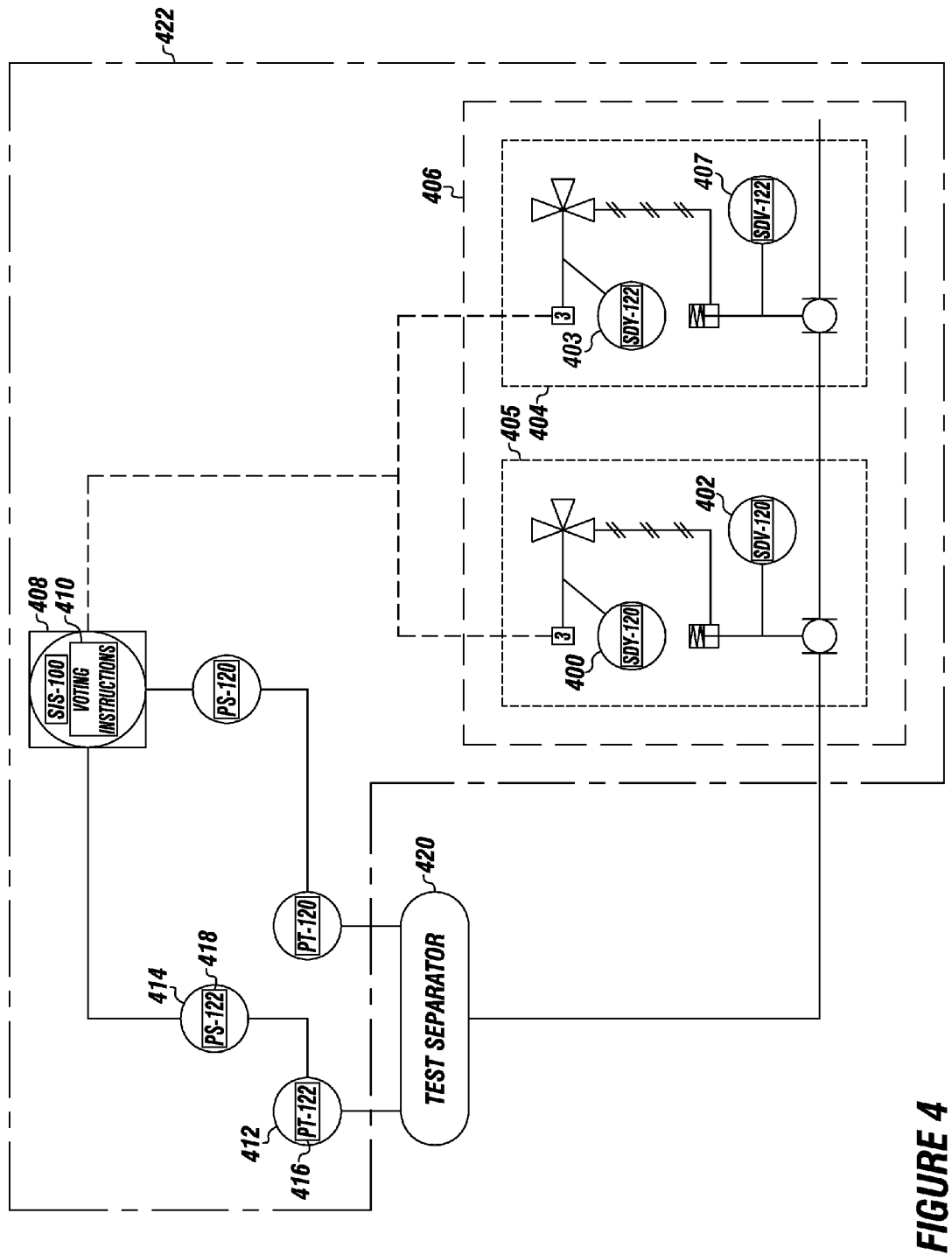
FIG. 4 shows a graphical depiction of a safety instrumented function (SIF) usable with the method.

FIG. 4 shows a graphical depiction of a safety instrumented function (SIF) 422 usable with the method.

A first assembly 405 can include a first component 400, such as SDY-120 and second component 402, such as SDV-120.

The first assembly 405 can be a part of an assembly group 406 with other assemblies such as a second assembly 404, which can have a second instance of a first component 403 and a second instance of the second component 407.

The safety instrumented function 422 can also have a logic solver 408, shown as SIS-100. The logic solver can contain voting instructions 410 which can be the logic used to process signals.

The safety instrumented function 422 can also have additional components. A first instance of a second component 412 is shown with a tag 416 as PT-122.

A second instance of a second component 414 is shown with a tag 418 as PT-122.

The safety instrumented function 420 can also have a test separator 420.

Computer instructions can create a tag based software model that represents the functional specifications for each of the identified instrumented protective functions (IPF) for the facility, for the identified piece of equipment, process or software, or combinations thereof, in real time.

In one or more embodiments, the combinations of libraries and relationship tables can define the physical specifications which can be needed to operate a facility safely with a safety instrumented system.

The term "physical specifications" as the term is used herein refers to the actual hardware, software, process or procedure of the facility and how these elements are actually connected together or used in sequence.

The combination of computer instructions, when actuated, can execute safety integrity level (SIL) calculations based on the physical specifications, voting instructions, and test interval specifications, and determine an average probability of failure on demand for each instrumented protective function (IPF).

As an example, an average probability of failure on demand of an IPF can be $1.57 \times 10^{-2}$ (scientific notation).

As shown in this Figure, the computer instructions permit a user to change any one component, one assembly, one assembly group, or combinations thereof or the voting instructions of the tag based software model.

As shown in this Figure, the computer instructions provide a connection to tag based assets of the facility that can allow transfer of data from tag based asset to the data storage associated with the processor.

The software model can further include a logic solver as a component of the instrumented protective functions (IPF) to execute the voting instructions that carry out the functions of the instrumented protective functions (IPF).

The logic solver provides a voting relationship, essentially a functional relationship, between the assemblies and assembly groups.

FIG. 5 shows an embodiment of a cause and effect report.

The cause and effect report can have general information such as a customer 500, a location 502, a project 504, a name 505, a title 506, a revision 508, a date 510, a drawing number 512, and general notes 514.

The cause and effect report can also have a table of causes 516 aligned to intersect a table of effects 518.

The table of causes 516 can have columns for causes P&ID 520, RC 522, notes 524, tag 526, description 528, type 530, trip SP 532, units 534, In/Dec 536, delay 538, voting 539, IPF 540, and SIL 542.

The table of effects 518 can have columns for effects equip 544, action 546, tag 548, description 550, notes 552, RC 554, and P&ID 556.

The intersection of the causes table 516 and effects table 518 can have a column 560 titled Num and a row 558 titled Num. The intersections can show causes and any corresponding effects.

Figure 6:
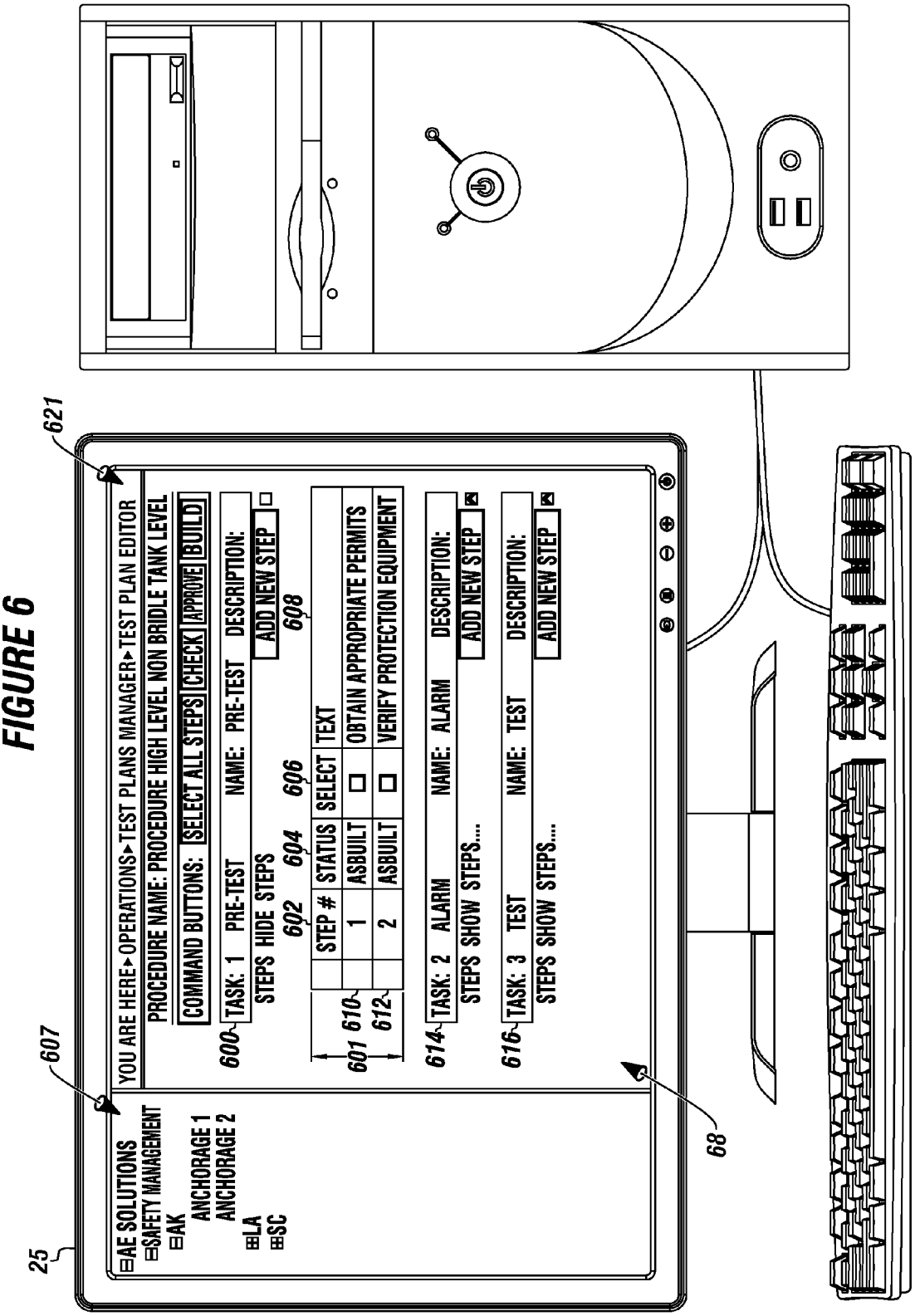
FIG. 6 is a view of a test plan template with a location tree.

FIG. 6 is an example of a test plan template 68 usable with the method.

Additionally, the method can use computer instructions to generate functional test plans for any one of the assemblies, one or more of the assembly groups, an instrumented protective function (IPF) or designated group of IPFs, and combinations thereof using the test plan templates.

The method, in embodiments, uses computer instructions for instructing the processor to select a test plan template from the plurality of test plan templates using functional specifications, physical specifications and a member of the group consisting of: an assembly, an assembly group, an instrumented protective function, or combinations thereof.

The functional test plans can be formulated from one of a plurality of test plan templates that can be preloaded and stored in the data storage. The test plan test plates can be user editable as a feature of this method. This means the user can modify quickly without the need for hiring an outside contractor at great expense and delay to get the information they need fast.

Figure 10B:
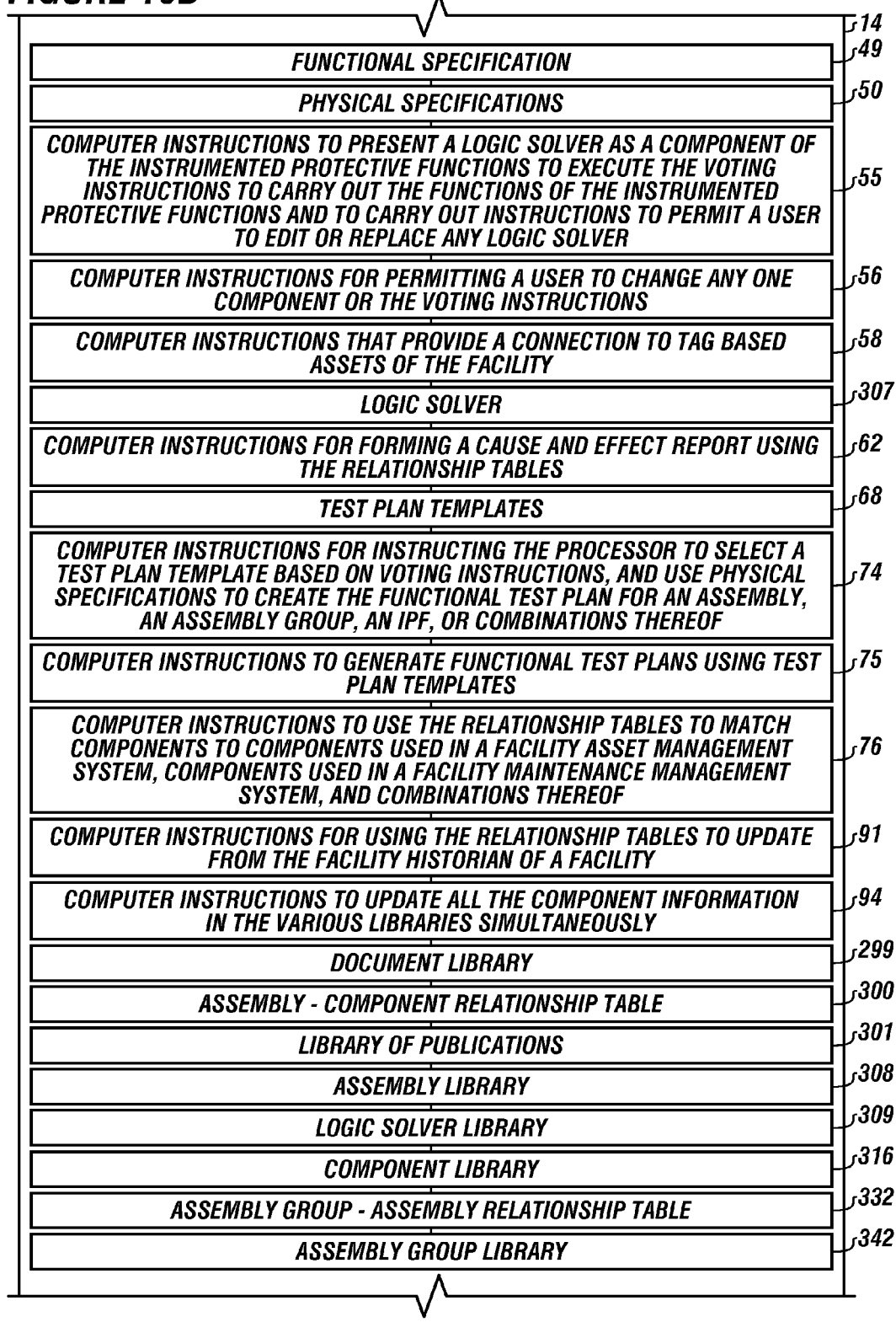
Figure 10C:
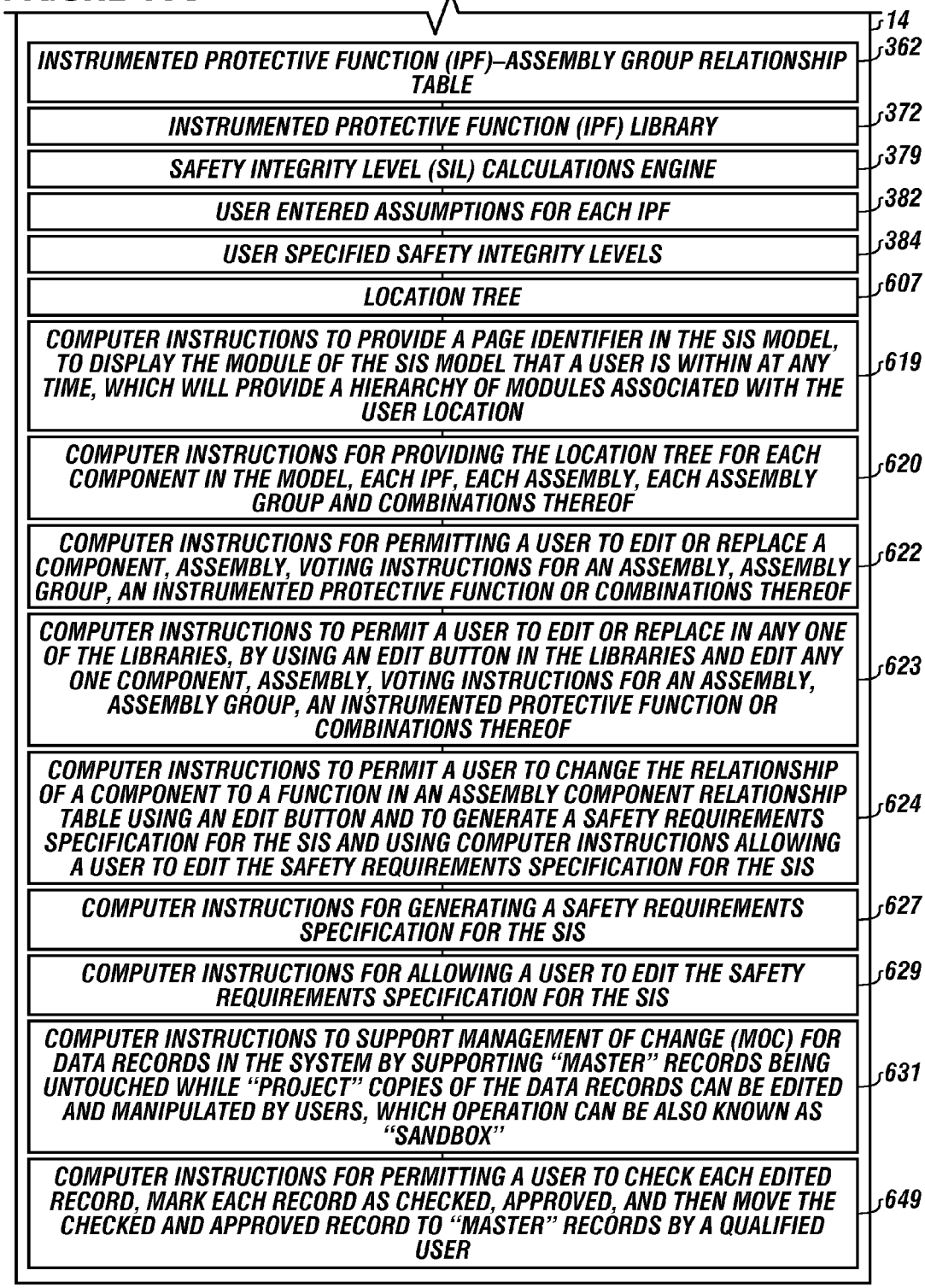

To understand the test plan template, computer instructions of FIG. 10C can be used with this Figure.

Namely, computer instructions 620 provide a location tree 607 on a test plan template for each component in the model, each IPF, each assembly, each assembly group and combinations thereof.

The method includes comprising using computer instructions 619 to provide a page identifier 621 on the test plan template.

The page identifier can be used throughout the SIS model to display which module of the SIS model that a user can be within at any time providing a hierarchy of modules associated with the user location.

The method, in an embodiment, uses computer instructions 623 to permit a user to edit or replace any one component, assembly, voting instructions for an assembly, assembly group, an instrumented protective function or combinations thereof, not only in the test plan template, but in all positions of the invention simultaneously.

The test plan template 68 of FIG. 6 can include one or more tasks, such as first task 600, second task 614, and third task 616, in support of process safety lifecycle management. Each task can include at least one instructional step, depicted here as first instructional step 610 and second instructional step 612, for test plan execution.

The test plan template 68 can include the first task 600, which can have a table of steps 601 with columns for: step number 602, status 604, select 606, and text 608.

The step number 602 column has a value shown as 1, the status 604 column set at a value such as ASBUILT, and the select 606 column can be a check box for selection of the step. The text 608 column can be set to a value such as it appears for this step as obtain appropriate permits.

The test plan template 68 can be presented on a display 25.

FIGS. 7A and 7B are an example of a test plan template that has been modified to a functional test plan.

An example functional test plan for an assembly, as shown in FIG. 7A and continued on 7B, can have tables, areas, spaces, or slots for general information about the test plan, such as facility 720 to identify the associated facility and an assembly name 721 to identify the associated assembly.

The functional test plan can also include a test plan name 724 to identify the test plan.

The functional test plan can also include tables, areas, spaces, or slots for a process description 726, test plan status and approval information 728, work requirements 730, such as required permits 731, drawings and documents for reference 732, assembly parameters/threshold limits 734, and comments about the assembly 736.

The functional test plan can also include an area to record test results 738.

The functional test plan can also include, as shown on 7B, an area for sign-off and approval 740.

The functional test plan can include a table of detail information and steps to execute 750. The table can have columns for task 700, step 702, staff 704, check mark box 706, and work method steps 708.

A task such as first task 710 can have multiple steps such as first step 712 and second step 718. The first step 712 can have an associated checkbox 714 to indicate completion of the step and an associated work method step 716 which can describe the step in detail, such as obtain the appropriate permits for the testing and provide the proper notifications to operating personnel regarding the testing, any special requirements, and subsequent alarms that can be generated.

The functional test plan can also include an area for tester comments—additional steps 742 and observed deficiencies and corrective actions 744.

In one or more embodiments, the test plan template can include a plurality of tasks in support of process safety lifecycle management. An example of a task can be opening a neck valve for a test plan template.

Each task can include at least one instructional step for functional test plan execution, or it can have a group of steps to achieve functional test plan execution.

Computer instructions 74 from FIG. 10B can instruct the processor to select a test plan template based on voting instructions from one of the tagged assets of the software model and use physical specifications of an assembly, an assembly group, an IPF, or combinations thereof which can have been identified in the data storage or in the software model.

The computer instructions 76 shown in FIG. 10B use the relationship tables to match components to either components used in a facility asset management system, components used in a facility maintenance management system, or combinations of these components in both facility asset management systems and facility maintenance management systems.

A "facility asset management system", as the term is used herein, includes computer software and/or hardware system(s) that aid in the process of managing tasks and decisions surrounding the purchase, ingestion, annotation, cataloguing, storage, retrieval, maintenance and distribution of physical assets in a facility (for example tracking the life cycle of a temperature sensor in a refinery).

A "facility maintenance management system", as the term is used herein means includes computer software and/or hardware system(s) that aid in managing an organizations maintenance operations in order to help maintenance workers do their jobs more effectively (for example, determining which equipment require maintenance and which storerooms contain the spare parts they need) and to help management make informed decisions (for example, calculating the cost of equipment breakdown repair versus preventive maintenance for the equipment, possibly leading to better allocation of resources).

In one or more embodiments, the matching of components matches failure rates in safety integrity level (SIL) calculations.

For example, the matching of components to safety integrity level SIL calculations can occur by first matching tag names in data storage to tag names in a facility asset management system. Then, that match can allow the failure rate in the data storage to be compared to failure rates being recorded by the facility asset management system.

An example an asset with a tag name PS-120 in the data storage matched to the tag name PS-120 in the facility asset management system. The failure rate for PS-120 in data storage can be 1 in 38,000 hours, and the failure rate for PS-120 in the facility asset management system can be 1 in 24,000 hours.

In one or more embodiments, the matching of components also matches test intervals in SIL calculations compared to actual test intervals in the facility maintenance management system.

An example an asset with a tag name PS-120 in the data storage matched to the tag name PS-120 in the facility maintenance management system. The test interval for PS-120 in data storage can be once every 12 months, and the test interval for PS-120 in the facility maintenance management system can be 1 time every 16 months.

In one or more embodiments, the matching of components compares trip points of parameters for each assembly to trip points recorded in one of the facility asset or maintenance management systems.

An example an asset with a tag name PS-120 in the data storage matched to the tag name PS-120 in the facility asset management system. The trip point for PS-120 in data storage can be 150 psig, and the trip point for PS-120 in the facility asset management system can be 170 psig.

FIGS. 8A and 8B show a representative table produced by the method for users that matches components of the facility to failure rates in safety integrity level SIL calculations and to those recorded by the facility asset management system, and the facility maintenance management system, as well as trip point parameters for assemblies to recorded trip points, and matches test intervals in SIL calculations to actual test intervals.

FIG. 8A shows the facility asset/maintenance management system table 800 can contain data to calculate a second failure rate 850

The facility asset/maintenance management system table 800 can have columns: tag name 802, field trip point 804, field trip units 806, test date 808, test result 810, and interval (since last test) 812.

A row in the table can contain values for the tag name 802, such as PS-120, values for the field trip point 804, such as 140, values for the field trip units 806, such as PSIG, values for the interval (since last test) 812, such as 0.

The table can also contain values for the test date 808, such as '1/12/2007' and test result 810 such as pass or fail, shown here as pass. These test results and dates can be used to determine the second failure rate 850.

The data from the facility asset/maintenance management system table 800 can be compared to data from an assembly data used for safety integrity level SIL calculations table 826, shown as FIG. 8B.

FIG. 8B shows the assembly data used for SIL calculations table 826 can include columns for: assembly identifier 828, tag name 830, parameter identifier 832, trip point 834, trip units 836, test interval (months) 838, and a first failure rate 840.

The tag name 830 can have a value, such as PS-120 and the first failure rate 840, such as 1/32,000 hr to compare with the second failure rate 850 calculated using the facility asset/maintenance management system table 800.

The facility asset/maintenance management system table can represent data from a facility asset management system, a facility asset maintenance management system, and combinations thereof.

FIG. 9 depicts an overview of the equipment used to implement the method to computer generate a real world model in software of a safety instrumented system (SIS) architecture for SIS in a facility.

It should be noted for this method that the instrumented protective functions (IPFs) can be safety instrumented functions, environmental instrumented functions, commercial instrumented functions, any other safety function that protects against harm to the environment, commercial assets, or people, or combinations thereof.

The method uses a system 8 with a processor 12 connected to a data storage 14. The processor can be in communication with a network 9. At least one client device 10 can be in communication with the network 9. Each client device can have a display for showing the status of compliance. Each client device can be manipulated by a user 6.

Also connected to the network 9 can be a facility historian 90, which is shown with a facility asset input device 95 and a facility asset display 93.

In one or more embodiments, the facility historian can contain a facility processor and facility data storage.

The system can use computer instructions 91, shown in FIG. 10B, and the relationship tables to match components from the component library for a facility to components in the facility historian using the asset identifier from the component library and recording the matched components, wherein the matching of components additionally validates a mean time to repair in the safety integrity level calculation as compared with actual unavailability time calculated by the facility historian.

FIGS. 10A-10C are details of the data storage and computer instructions contained therein.

The data storage 14 can include computer instructions for forming a component library 16; computer instructions for forming an assembly library 18; computer instructions for forming an assembly-component relationship table 22; computer instructions for forming an assembly group library 26; and computer instructions for forming an assembly group-assembly relationship table 30.

The data storage 14 can include computer instructions for forming, storing and using the document library 31.

The data storage 14 can include computer instructions for forming a library of instrumented protective functions (IPF) 32.

The data storage 14 can include computer instructions to form, store and use a library of publications 33.

The data storage 14 can include computer instructions for forming an instrumented protective function (IPF)-assembly group relationship table 34.

The data storage 14 can include computer instructions for analyzing functional relationships between assembly groups and assemblies 35.

The data storage 14 can include computer instructions for creating a tag based model with tags and voting instructions 36.

The data storage 14 can include computer instructions in the data storage to assign at least one voting instruction to at least one assembly identifier and at least one assembly group identifier, creating the computer generated safety instrumented model with a functional specification and a physical specification for all of the instrumented protective functions (IPF) for a facility in real time 37.

The data storage 14 can include computer instructions to provide an actuator to apply a tag to assets of the facility 39.

The data storage 14 can include computer instructions for adding a functional specification of the instrumented protective function (IPF) for the facility in real time, wherein real time can be a unit of time that can be less than 14 calendar days 42.

The data storage 14 can include computer instructions for executing SIL calculations that use physical specifications, voting instructions, and test interval specifications to determine an average probability of failure on demand for each instrumented protective function (IPF) 46.

Voting instructions can refer to a plurality of logical "and" gates and "or" gates used to translate input signals received by the processor into output signals that actuate one or more of protective layers.

The data storage 14 can include computer instructions to compare in real time actual safety integrity levels achieved at the facility determined by the computer generated safety instrumented model to user specified safety integrity levels and identify gaps between an actual safety integrity levels and user specified safety integration levels for the facility 47.

The data storage 14 can include the functional specification 49 for each component and the physical specifications 50 for each component.

The data storage 14 can include computer instructions to present a logic solver as a component of the instrumented protective functions to execute the voting instructions to carry out the functions of the instrumented protective functions and to carry out instructions to permit a user to edit or replace any logic solver 55.

The data storage 14 can include computer instructions for permitting a user to change any one component or the voting instructions 56.

The data storage 14 can include computer instructions that provide a connection to tag based assets of the facility 58.

The data storage 14 can include the logic solver 307.

The logic solver can analyze interrelationships between protective layers, assembly groups, and assemblies and be a standalone processor or a virtual machine.

The data storage 14 can include computer instructions for forming a cause and effect report using the relationship tables 62.

The data storage can include test plan templates 68.

The data storage 14 can include computer instructions for instructing the processor to select a test plan template based on voting instructions, and use physical specifications to create the functional test plan for an assembly, an assembly group, an IPF, or combinations thereof 74.

The data storage 14 can include computer instructions to generate functional test plans using test plan templates 75.

The data storage 14 can include computer instructions to use the relationship tables to match components to components used in a facility asset management system, components used in a facility maintenance management system, and combinations thereof 76.

These computer instructions can match: failure rates in the safety integrity level calculations compared to actual failure rates recorded by the facility asset management system or a facility maintenance management system; test intervals in the safety integrity level calculations compared to actual test intervals recorded by the facility asset management system or the facility maintenance management system; and/or trip points of parameters for each assembly compared to trip points recorded by the facility asset management system or the maintenance management system The facility asset management system and facility maintenance management system can be part of the equipment shown in FIG. 9 transferring data through a network, a manual import, or the like.

The data storage 14 can contain computer instructions for using the relationship tables to update from the facility historian of a facility 91.

The facility historian can be a part of the overall method, and transfer data through a network, via a manual import, or the like. The facility historian can be a database in data storage of a server that connects to a facility to monitor, in real time, process controllers and operations of the facility.

The data storage 14 can include computer instructions to update all the component information in the variously libraries simultaneously 94.

The data storage 14 can include the document library 299, the assembly-component relationship table 300, the library of publications 301, the assembly library 308, the logic solver library 309, the component library 316, the assembly group-assembly relationship table 332, the assembly group library 342, the instrumented protective function (IPF)-assembly group relationship table 362, the instrumented protective function (IPF) library 372, or combinations thereof.

The data storage 14 can include the safety integrity level (SIL) calculations engine 379.

The data storage 14 can include the user entered assumptions for each IPF 382.

The data storage 14 can include the user specified safety integrity levels 384.

The data storage 14 can include the location tree 607.

The data storage 14 can include computer instructions to provide a page identifier in the SIS model, to display the module of the SIS model that a user is within at any time, which will provide a hierarchy of modules associated with the user location 619.

The data storage 14 can include the computer instructions for providing the location tree for each component in the model, each IPF, each assembly, each assembly group and combinations thereof 620.

The data storage can include computer instructions for permitting a user to edit or replace a component, assembly, voting instructions for an assembly, assembly group, an instrumented protective function or combinations thereof 622.

The data storage 14 can include computer instructions to permit a user to edit or replace in any one of the libraries, by using an edit button in the libraries and edit any one component, assembly, voting instructions for an assembly, assembly group, an instrumented protective function or combinations thereof 623.

The data storage 14 can include computer instructions to permit a user to change the relationship of a component to a function in an assembly component relationship table using an edit button and to generate a safety requirements specification for the SIS and using computer instructions allowing a user to edit the safety requirements specification for the SIS 624.

The data storage 14 can include computer instructions for generating a safety requirements specification for the SIS 627.

The data storage 14 can include computer instructions for allowing a user to edit the safety requirements specification for the SIS 629.

The data storage 14 can include computer instructions to support management of change (MOC) for data records in the system by supporting "Master" records being untouched while "Project" copies of the data records can be edited and manipulated by users, which operation can be also known as "Sandbox" 631.

The data storage can also include computer instructions for permitting a user to check each edited record, mark each record as checked, approved, and then move the checked and approved record to "Master" records by a qualified user 649.

FIG. 11 is a representation of the libraries that can be stored in the data storage 14.

The component library 316 can contain a plurality of components 17a, 17b, and 17c. For example, the component library can include information on a sensor, transmitter, control device, pump, motor, or solenoids.

The assembly library 308 can contain a plurality of assemblies 19a, 19b, and 19c. Each assembly 19a, 19b, and 19c can have a test interval specification 21a, 21b, and 21c, for example a test interval of 30 days. Assemblies represent groups of components connecting a processor to a process of the facility.

The assembly group library 342 can contain a plurality of assembly groups 13a, 13b, and 13c, such as pairs of sensors.

The instrumented protective function (IPF) library 372 can contain a plurality of instrumented protective functions (IPFs), 38a, 38b, and 38c.

The logic solver library 309 can contain a plurality of logic solvers 307a, 307b, and 307c.

The document library 299 can have a plurality of documents 298a, 298b, and 298c.

Figure 12:
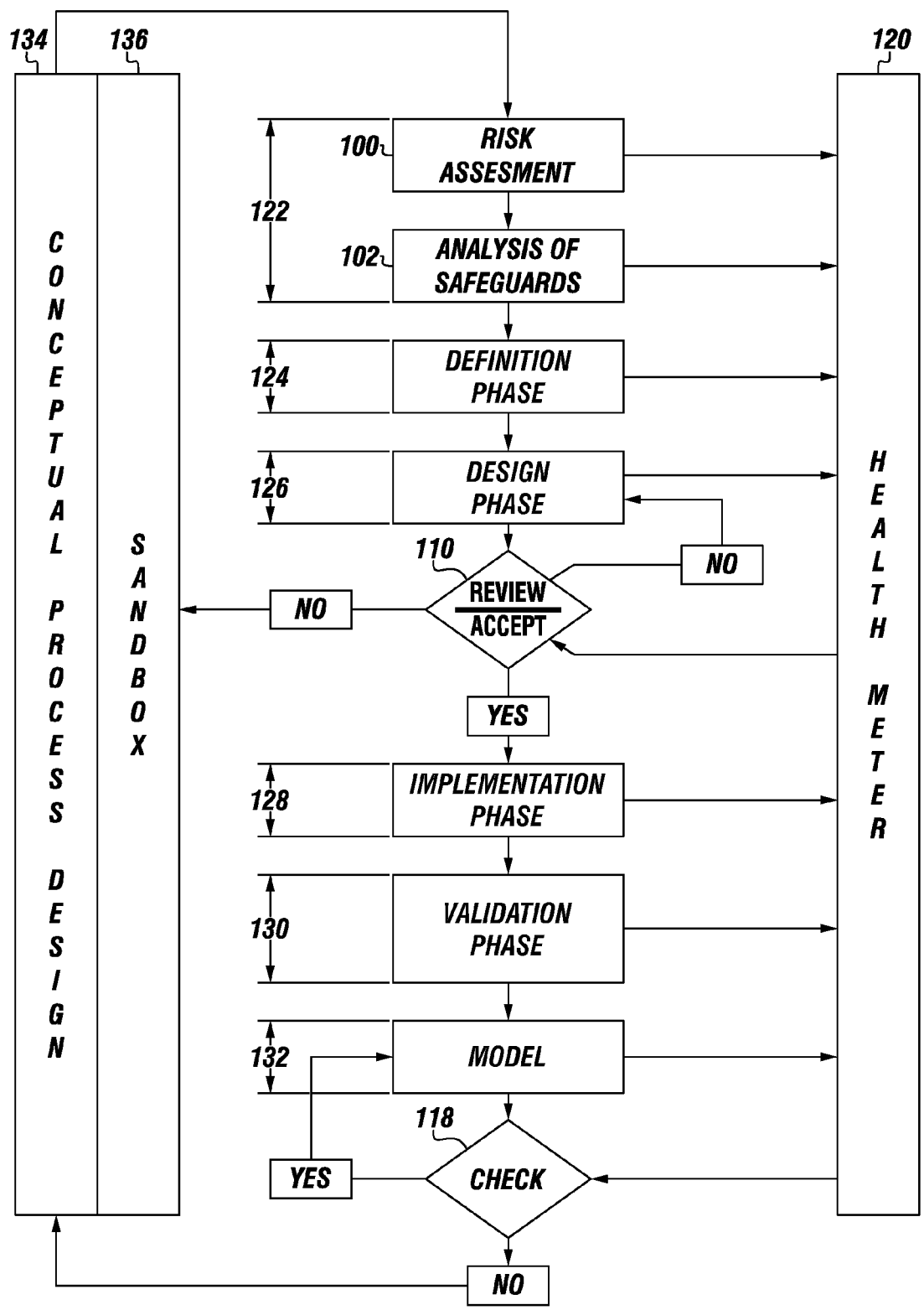
FIG. 12 is an embodiment of a sequence of steps of the method for compliance with an OSHA regulation.

FIG. 12 shows an embodiment of an overall sequence of steps implemented by the method.

The method acquires a risk assessment 100 for a portion of a specific facility, such as refinery.

The method acquires an analysis of safeguards 102 (a LOPA) for the specific facility wherein the LOPA indicates risk, such as portions of the facility that might be prone to loss of human life. The analysis of safeguards and the LOPA make up an assess phase 122.

A definition phase 124 follows the assess phase 122 and it involves editing and verifying safety requirement specifications for the safety instrumented system (SIS) with a user interface.

The next phase used by the method can be a design phase 126 that involves using the method to enter and verify a SIS design and optimization using an IPF model with SIL engine for the specific process or portion of the facility.

Reviews and accept or review and decline acceptance of the SIS design, shown here as review and accept 110 for compliance with a statute, a regulation, or a business criteria, such as an OSHA regulation.

Next the method creates an implementation phase 128, which can include installing an assembly, IPF, or component. Next the method creates a validation phase 130 which commissions the component, assembly, assembly group, or IPF, and then validates the assembly, assembly group, IPF, using a test plan created by the method.

The next step involves operating and maintaining all or a portion of the facility by running the assembly, assembly group, IPF, or component, and re-testing the component, assembly, assembly group and/or IPF on a required test interval as documented in a model 132.

The method implements a check 118 which involves checking if the test results from the prior step are acceptable. If they are not, then the user must restart the process from the beginning.

The entire stage from risk assessment 100 to check 118 involves using a conceptual process design 134 in the previously identified data storage which can be accessed through a sandbox 136 in an embodiment.

The sandbox can allow a user to make a series of changes that can be used in the final implementation in order to evaluate potential changes to the component, assembly, assembly group, and impact on achieved SIL.

Additionally a health meter 120 can monitor the entire sequence of steps, wherein the health meter provides verification and integration and a checking of reality versus plan codes, standards and recognized good engineering practices in real time constantly during the entire process.

For this unique method, the computer instructions, when actuated, can execute safety integrity level (SIL) calculations for each asset of the facility can have a tag with voting instructions based on the functional specification, the physical specification, and user entered assumptions to determine an average probability of failure on demand and architectural restraint requirements for each instrumented protective function (IPF) and validate the assumptions used in the SIL calculations by comparing to actual performance of each IPF in the facility.

An embodiment can include computer instructions to categorize failures (Failure Rate Analysis) and provide statistically analyzed failure rates to be used in SIL calculations.

An embodiment can include computer instructions to allow users to select which set of reliability data they want to use, the data stored in the reliability library in the data storage, the data collected from their facility and analyzed in by the failure rate analysis portion of the method, or user entered data.

An embodiment can include computer instructions and system architecture to support Management of Change (MOC) of data records usable by the method.

The method can support "Asbuilt" or "Master" Records, being untouched while "Project" copies of the records can be edited and manipulated by users, also known as "sandbox." Each edited record can be checked, approved, and then moved to "Asbuilt" by qualified users.

"Qualified Users" can mean users with sufficient permissions and roles tied to their login indicating they are able to perform the check and approve activities. Previous "Asbuilt" versions of the records can be archived to maintain revision history.

In one or more embodiments, the method can include using computer instructions to allow users to enter data and perform analysis to support PHA and LOPA.

An embodiment can include computer instructions to support analysis of protective layers to be applied to reduce probability of a hazardous event occurring.

An embodiment can include computer instructions to include analysis to calculate SIL required to reduce the risk to target level.

An embodiment can include computer instructions to connect the data of the PHA and LOPA to the SIL calculation portion of the application.

An embodiment can include computer instructions to allow users to enter tolerable risk criteria for their organization.

An embodiment can include computer instructions to support revision tracking and impact reporting on proposed changes.

An embodiment can include computer instructions to allow users to enter proposed changes and view impact reports prior to approving the change.

An embodiment can include computer instructions to allow users to enter initiating causes captured in the facility which required the SIS or other protective layers to respond.

An embodiment can include computer instructions to allow users to manage imports of PHA and LOPA import from other tools.

An embodiment can include computer instructions to analyze SIL calculations and automatically identify optimum proof test intervals that can still meet SIL.

An embodiment can include computer instructions to allow a user to enter relief valve sizing basis during design phase of a project.

An embodiment can include computer instructions to allow users to search for a relief valve sizing basis by tag name to support PHA/LOPA activities.

An embodiment can include computer instructions to create a report showing relief valve sizing basis for all relief valves used for risk reduction in a PHA/LOPA for a facility.

Figure 13A:
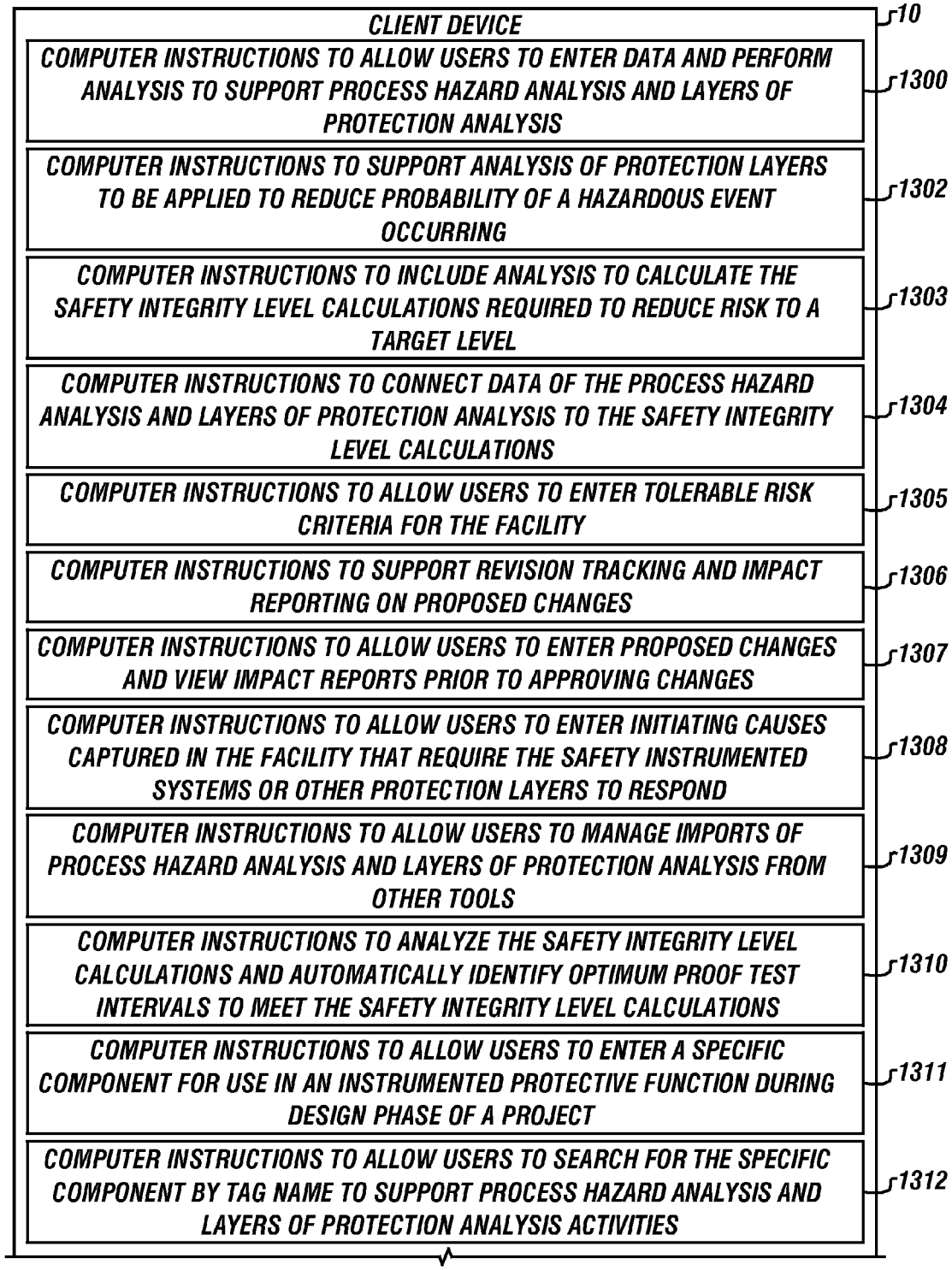
Figure 13B:
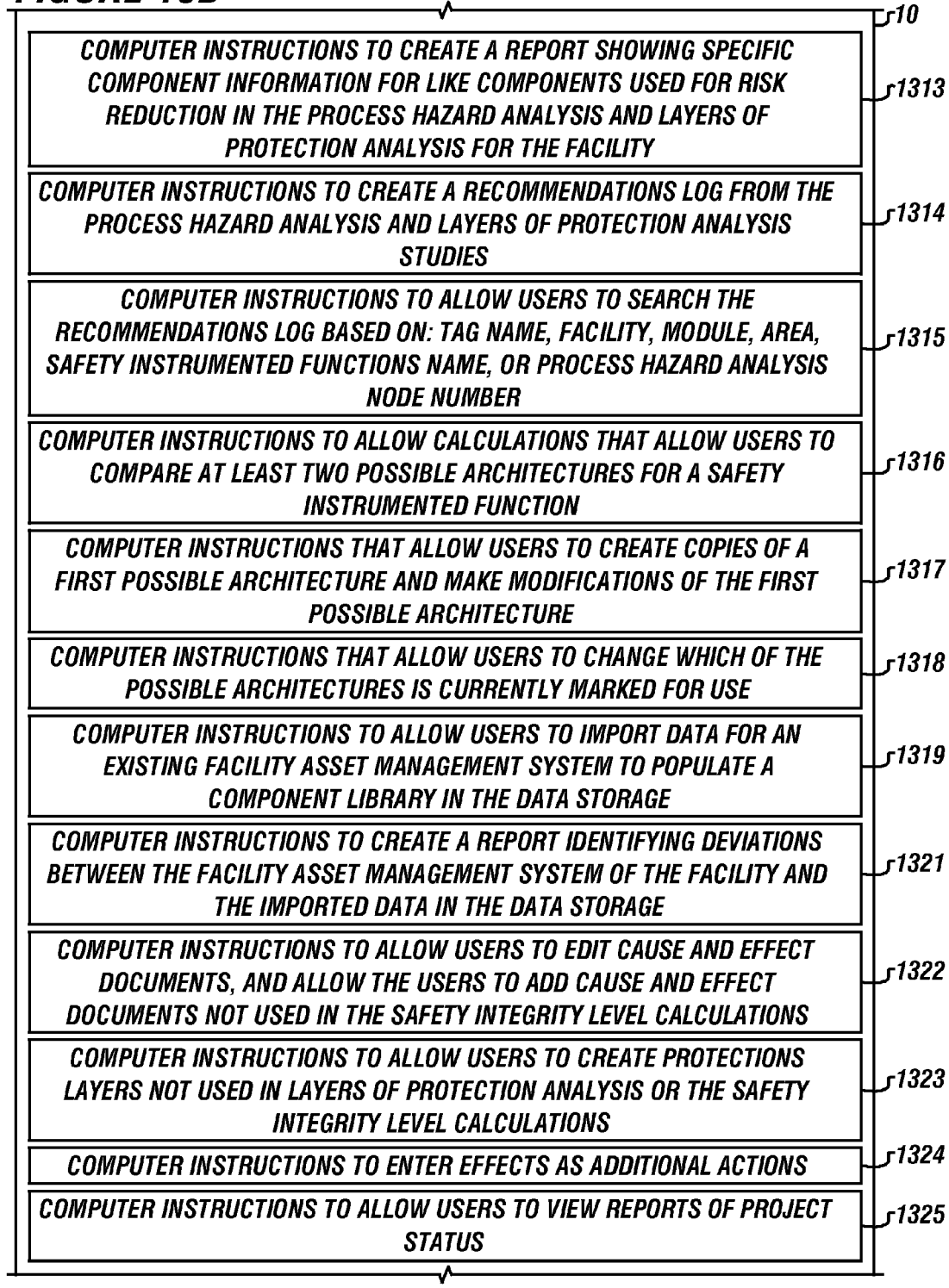

FIGS. 13A-13C depict an embodiment of the client device 10, which can include various additional computer instructions usable with the executive dashboard.

In one or more embodiments, the client device 10 can include computer instructions to allow users to enter data and perform analysis to support process hazard analysis and layers of protection analysis 1300.

In one or more embodiments, the client device 10 can include computer instructions which can be used to support analysis of protection layers to be applied to reduce probability of a hazardous event occurring 1302.

In one or more embodiments, the client device 10 can include computer instructions which can be used to include analysis to calculate the safety integrity level calculations required to reduce risk to a target level 1303.

In one or more embodiments, the client device 10 can contain computer instructions which can be used to connect data of the process hazard analysis and layers of protection analysis to the safety integrity level calculations 1304.

In one or more embodiments, the client device 10 can include computer instructions which can be used to allow users to enter tolerable risk criteria for the facility 1305.

In one or more embodiments, the client device 10 can include computer instructions that are used to support revision tracking and impact reporting on proposed changes 1306.

In one or more embodiments, the client device 10 can include computer instructions that are used to allow users to enter proposed changes and view impact reports prior to approving changes 1307.

In one or more embodiments, the client device 10 can include computer instructions to allow users to enter initiating causes captured in the facility that require the safety instrumented systems or other protection layers to respond 1308.

In one or more embodiments, the client device 10 can include computer instructions to allow users to manage imports of process hazard analysis and layers of protection analysis from other tools 1309.

In one or more embodiments, the client device 10 can include computer instructions which can be used to analyze the safety integrity level calculations and automatically identify optimum proof test intervals to meet the safety integrity level calculations 1310.

In one or more embodiments, the client device 10 can include computer instructions to allow users to enter a specific component for use in an instrumented protective function during design phase of a project 1311.

In one or more embodiments, the client device 10 can include computer instructions to allow users to search for the specific component by tag name to support process hazard analysis and layers of protection analysis 1312.

In one or more embodiments, the client device 10 can include computer instructions to create a report showing specific component information for like components used for risk reduction in the process hazard analysis and layers of protection analysis for the facility 1313.

In one or more embodiments, the client device 10 can include computer instructions in the client device to create a recommendations log from the process hazard analysis and layers of protection analysis studies 1314.

In one or more embodiments, the client device 10 can include computer instructions to allow users to search the recommendations log based on: tag name, facility, module, area, safety instrumented functions name, or process hazard analysis node number 1315.

In one or more embodiments, the client device 10 can include computer instructions to allow calculations that allow users to compare at least two possible architectures for a safety instrumented function 1316.

In one or more embodiments, the client device 10 can include computer instructions to allow users to create copies of a first possible architecture and make modifications of the first possible architecture 1317.

In one or more embodiments, the client device 10 can contain computer instructions to change which of the possible architectures is currently marked for use 1318.

In one or more embodiments, the client device 10 can contain computer instructions to import data for an existing facility asset management system to populate a component library in the data storage 1319.

In one or more embodiments, the client device 10 can contain computer instructions to create a report identifying deviations between the facility asset management system of the facility and the imported data in the data storage 1321.

In one or more embodiments, the client device 10 can contain computer instructions to edit cause and affect documents, and allow the users to add cause and effect documents not used in the safety integrity level calculations 1322.

In one or more embodiments, the client device 10 can contain computer instructions to create protections layers not used in layers of protection analysis or the safety integrity level calculations 1323.

In one or more embodiments, the client device 10 can contain computer instructions to enter effects as additional actions in the formed model 1324.

In one or more embodiments, the client device 10 can contain computer instructions to allow users to view reports of project status 1325.

In one or more embodiments, the client device 10 can contain computer instructions to generate facility acceptance tests using a software model of physical and functional specifications 1326.

In one or more embodiments, the client device 10 can include a software model of physical and functional specifications 1327.

In one or more embodiments, the client device 10 can contain computer instructions to generate site acceptance tests using the software model of physical and functional specifications 1328.

In one or more embodiments, the client device 10 can include computer instructions to generate functional test plans for each safety instrumented function of the instrumented protective function 1329.

In one or more embodiments, the client device 10 can contain computer instructions to generate a critical alarm list including risk ranking of hazards to which alarms apply 1330.

In one or more embodiments, the client device 10 can contain computer instructions to generate a report of test performance for critical alarms 1331.

In one or more embodiments, the client device 10 can contain computer instructions to generate a report showing impact of bypassing on a risk gap being opened by placing equipment in bypass 1332.

In one or more embodiments, the client device 10 can contain computer instructions to categorize failures from failure rate analysis and provide statistically analyzed failure rates to be used in safety integrity level calculations 1333.

In one or more embodiments, the client device 10 can contain computer instructions to select which set of reliability data they want to use 1334.

For example, the users can select from data stored in a reliability library 1335, data collected from the facility and analyzed by failure rate analysis, or user entered data.

In one or more embodiments, the client device 10 can contain computer instructions to support management of change (MOC) of data records 1336.

For example, the client device can support "asbuilt" or "Master" records remaining untouched while "Project" copies of records can be edited and manipulated by users. Each edited record can be checked, approved, and then moved to "asbuilt" by qualified users. Qualified users can include users with sufficient permissions and roles tied to their respective login indicating that they can be able to perform the check and approve activities. Previous "asbuilt" versions of records can be archived to maintain a revision history.

In one or more embodiments, the client device 10 can contain computer instructions to permit a user to change any one component, one assembly, one assembly group, or combinations thereof or the voting instructions of a tag based software model 1338.

In one or more embodiments, the client device 10 can contain computer instructions to provide a connection to tag based assets of the facility that can allow transfer of data from tag based assets to the data storage associated with the processor 1340.

In one or more embodiments, the client device 10 can include computer instructions to assign a tag name to at least one component identifier while assigning the voting instruction to at least one assembly identifier and at least one assembly group identifier, creating the computer generated safety instrumented model with a functional specification and a physical specification for all of the instrumented protective functions (IPF) for a facility in real time 1341.

In one or more embodiments, the client device 10 can include computer instructions to use relationship tables and libraries to form a cause and effect report 1342.

Figure 14:
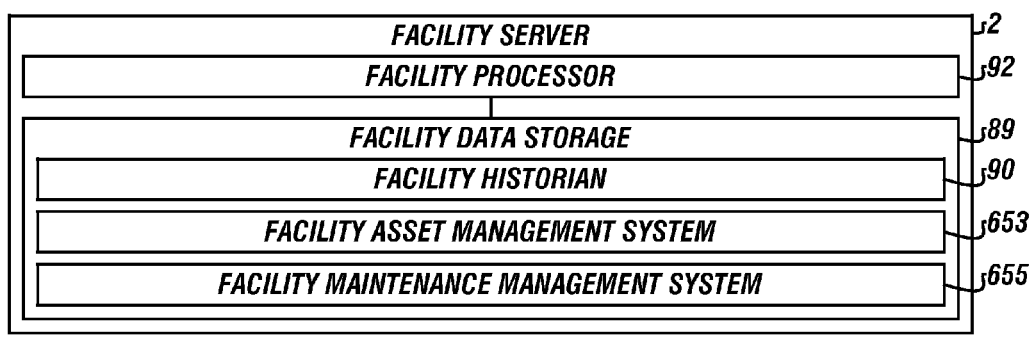
FIG. 14 depicts a facility server according to one or more embodiments.

FIG. 14 is an embodiment of a facility server 2.

The facility server 2 can include a facility data storage 89 and a facility processor 92. The facility data storage 89 can connect with the facility processor 92.

The facility data storage 89 can include the facility historian 90.

The facility maintenance management system 655 and the facility asset management system 653 can reside in a facility data storage 89 which can be connected to the facility processor 92 associated with a facility asset input device and a facility asset display, described in FIG. 9.

Figure 15:
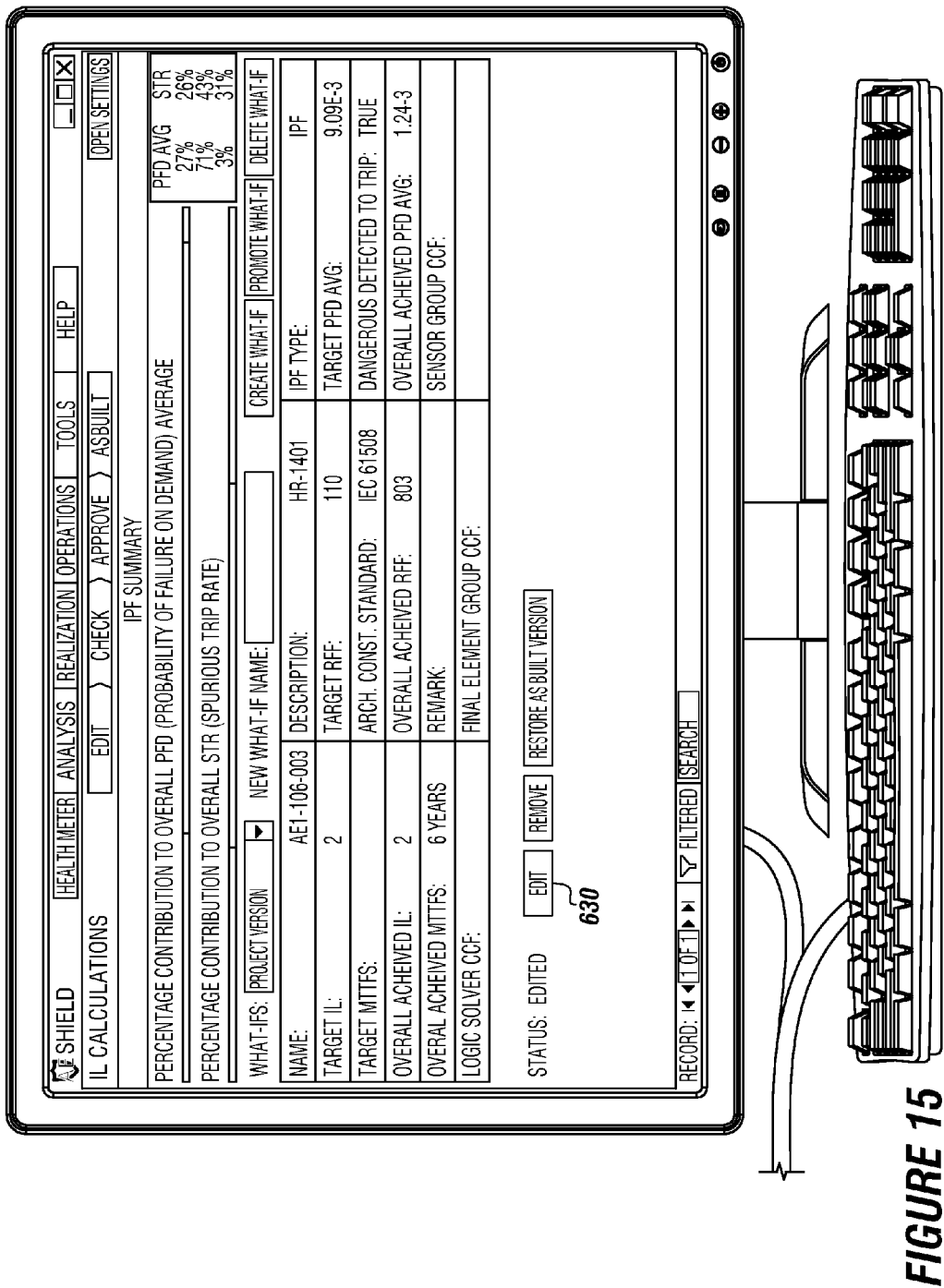
FIG. 15 depicts an editable embodiment of the test plans created by the method.

FIG. 15 depicts the edit button 630 for a formed test plan wherein a user clicking on the edit button can insert, delete, or modify a component which creates an across all database and library change simultaneously.

While these embodiments have been described with emphasis on the embodiments, it should be understood that within the scope of the appended claims, the embodiments might be practiced other than as specifically described herein.

What is claimed is:

1. A method for computer generating a safety instrumented model for managing a process safety lifecycle for a safety instrumented system in a facility, wherein the safety instrumented model has at least one instrumented protective function, and wherein the method comprises:
   a. connecting a processor to a data storage and a network to communicate with at least one client device, wherein the client device has a client device processor, a client device data storage, and input and output ports;
   b. using non-transitory computer instructions in the data storage forming a component library for the facility for a plurality of components consisting of a component identifier, a tag name, a component type and an equipment type;
   c. using non-transitory computer instructions in the data storage forming an assembly library for the facility with each assembly having an assembly identifier, a name, an assembly type, a location, and a test interval specification;
   d. using non-transitory computer instructions in the data storage forming an assembly-component relationship table, wherein the component library and the assembly library enable the assembly-component relationship table to depict a relationship between one of the assemblies and at least one component using the component identifier, the assembly identifier and a purpose for each component connected to the assembly identifier;
   e. using non-transitory computer instructions in the data storage forming an assembly group library for the facility using an assembly group identifier, voting instructions, and a group type;
   f. using non-transitory computer instructions in the data storage forming an assembly group-assembly relationship table, wherein the assembly group library and the assembly library enable the assembly group-assembly relationship table to depict a relationship between at least one assembly group and at least one assembly and to provide a parameter for each assembly using the assembly group identifier, the assembly identifier, an assembly parameter identifier and an assembly parameter value;
   g. using non-transitory computer instructions in the data storage forming a instrumented protective function library for the facility having an instrumented protective function identifier, an instrumented protective function name, an input group voting, and an output group voting;
   h. using non-transitory computer instructions in the data storage forming an instrumented protective function (IPF)-assembly group relationship table, wherein the instrumented protective function library and the assembly group library enable the instrumented protective function (IPF)-assembly group relationship table to depict a relationship between at least one instrumented protective function and at least one assembly group, forming a safety instrumented system with at least one instrumented protective function creating a real world model of the instrumented protective function using the instrumented protective function identifier, the assembly group identifier, and a relationship identifier;

i. using non-transitory computer instructions in the data storage assigning at least one voting instruction to the at least one assembly identifier and the at least one assembly group identifier, creating the computer generated safety instrumented model with a functional specification and a physical specification for all of the instrumented protective functions for a facility in real time;

j. using non-transitory computer instructions in the data storage to execute safety integrity level calculations using:
  i. a logic solver with a logic solver library, wherein the logic solver library comprises: a logic solver identifier, a logic solver location, a name and a testing interval;
  ii. a safety integrity level calculation engine;
  iii. a plurality of components each having a tag name with voting instructions;
  iv. functional specifications for each instrumented protective function;
  v. physical specifications for each instrumented protective function;
  vi. user entered assumptions for each instrumented protective function; and
    wherein the safety integrity level calculations identifies and verifies that the safety integrity level calculations are met simultaneously for each instrumented protective function providing an average probability of failure on demand for the instrumented protective function; and architectural constraint requirements for the instrumented protective function; and k. using non-transitory computer instructions in the data storage in real time to compare actual safety integrity levels achieved at the facility determined by the computer generated safety instrumented model to user specified safety integrity levels and identify gaps between an actual safety integrity levels and user specified safety integration levels for the facility.

2. The method of claim 1, further comprising using computer instructions to form, store and use a document library as step, wherein the document library comprises:
  a. a document identifier that provides a link to the document library;
  b. document types:
    i. cause and effect diagram documents;
    ii. safety requirements specification documents;
    iii. layer of protection analysis document types;
    iv. test plan procedures;
    v. safety integrity level calculation modeling files;
    vi. override risk assessments;
    vii. safety integrity level calculations; and
    viii. combinations thereof;
  c. document names; and
  d. document descriptions.

3. The method of claim 1, further comprising using computer instructions to form, store and use a library of publications viewable for compliance, wherein the library of publications comprises:
  a. statutes;
  b. industry standards;
  c. national regulations;
  d. business owner specific policies; and
  e. combinations thereof.

4. The method of claim 1, wherein the component library comprises:
  a. a name representing an instance of equipment type;
  b. a process description;
  c. an equipment type;
  d. a component identifier for components in the assembly for identifying the component in the method;
  e. a component type describes a specific installation and operation at that specific installation;
  f. a tag name for identifying the instrument in a drawing;
  g. an asset identifier for identifying the instrument with a third party system to track the instrument location for maintenance, additional use, cost of ownership, and for use in inventory management;
  h. a means for reconciling identifier for component lists with third party software related to the instrument; and
  i. combinations thereof.

5. The method of claim 1, wherein the assembly library comprises:
  a. a name of the assembly representing at least one component;
  b. a process description of the assembly;
  c. an assembly type describes a specific installation and operation at that specific installation;
  d. a location of the assembly in a facility;
  e. the assembly identifier for the assembly for use in the library;
  f. an assembly probability of failure on demand calculated by a safety integrity level calculation engine;
  g. an assembly based actuator to permit overrides of the safety integrity level calculation engine and allow manual entry of a probability of failure for that assembly;
  h. a document identifier that provide a link to the document library; and
  i. an overt fault status that describes a state to transition an assembly to when an overt fault is recognized.

6. The method of claim 1, wherein the assembly-component relationship table comprises: an assembly identifier, a component identifier, a purpose, and the logic solver.

7. The method of claim 1, wherein the logic solver library comprises:
  a. a logic solver identifier;
  b. a logic solver location;
  c. a name of a logic solver;
  d. a description of the logic solver;
  e. a probability of failure on demand for the logic solver; and
  f. a test interval to define a required test.

8. The method of claim 1, wherein the assembly group library comprises:
  a. an assembly group identifier;
  b. a name of each assembly group;
  c. voting instruction of each assembly group;
  d. a user entered assumption for an assembly group;
  e. a calculated assembly group failure on demand;
  f. an assembly group type; and
  g. a document identifier associated with each assembly group; and
  h. combinations thereof.

9. The method of claim 1, wherein the instrumented protective function (IPF) library comprises:
  a. a protective layer identifier;
  b. an instrumented protective function name;
  c. an input group voting instruction;
  d. an output group voting instruction;
  e. a calculated instrumented protective function probability of failure on demand; and f. an instrumented protective function based actuator to permit override of the instrumented protective function safety integrity level calculation engine and allow manual entry of a probability of failure for that instrumented protective function.

10. The method of claim 1, wherein the assembly group-assembly relationship table comprises:
   a. an assembly group identifier;
   b. an assembly identifier;
   c. an assembly parameter identifier;
   d. an assembly parameter value; and
   e. an assembly parameter unit.

11. The method of claim 1, wherein the instrumented protective function (IPF)-assembly group relationship table comprises:
   a. an instrumented protective function identifier;
   b. an assembly group identifier;
   c. an instrumented protective function to assembly group relationship identifier; and
   d. an indication that an assembly group is functioning as additional action not included in the instrumented protective function safety integrity level calculation engine.

12. The method of claim 1, further comprising using computer instructions to provide a location tree for each component in the safety instrumented system model, each instrumented protective function, each assembly, each assembly group and combinations thereof.

13. The method of claim 12, further comprising using computer instructions to provide a page identifier in the safety instrumented system model, to display a module of the module model that a user is within at any time on demand or at a preset time interval, which will provide a hierarchy of modules associated with the user location.

14. The method of claim 1, further comprising using computer instructions that permit a user to edit or replace in any one of the libraries, by using an edit button in the libraries for any one component, any one assembly, voting instructions for an assembly, assembly group, an instrumented protective function or combinations thereof.

15. The method of claim 1, further comprising using computer instructions that permit a user to change the relationship of a component to a function in an assembly component relationship table using a edit button and to generate a safety requirements specification for the safety instrumented system and using computer instructions allowing the user to edit the safety requirements specification for the safety instrumented system.

16. The method of claim 1, further comprising using computer instructions that provide an actuator to apply a tag to assets of the facility.

17. The method of claim 1, further comprising using computer instructions to include the logic solver as a component of the instrumented protective function to execute the voting instructions to carry out the functions of the instrumented protective function and to carry out instructions to permit a user to edit or replace any logic solver.

18. The method of claim 1, further comprising using computer instructions to use the relationship tables to form a cause and effect report for a user for each instrumented protective function.

19. The method of claim 1, further comprising using computer instructions for instructing the processor to select a test plan template from the plurality of test plan templates using functional specifications, physical specifications and a member of the group consisting of: an assembly, an assembly group, an instrumented protective function, or combinations thereof and generate functional test plans for a member of the group consisting of: an assembly, an assembly group, an instrumented protective function, and combinations thereof; using at least one of the plurality of test plan templates stored in the data storage.

20. The method of claim 19, wherein the test plan template comprises a plurality of tasks in support of process safety lifecycle management, and each task comprises at least one instructional step for test plan execution.

21. The method of claim 1, further comprising using computer instructions to use to match the asset identifier from the component library for the facility to components used in a facility asset management system, and to match components used in a facility maintenance management system, and combinations thereof; wherein the matching of components matches:
   a. failure rates in the safety integrity level calculations compared to actual failure rates recorded by the facility asset management system or the facility maintenance management system;
   b. test intervals in the safety integrity level calculations compared to actual test intervals recorded by the facility asset management system or the facility maintenance management system; or
   c. trip points of parameters for each assembly compared to trip points recorded by the facility asset management system or the maintenance management system.

22. The method of claim 21, further comprising using computer instructions to use the relationship tables to match components from the component library for the facility to components in a facility historian using the asset identifier from the component library and recording the matched components, wherein the matching of components additionally validates a mean time to repair in the safety integrity level calculations as compared with actual unavailability time calculated by the facility historian.

23. The method of claim 1, further comprising using computer instructions to update all instances of the component, the assembly, the assembly group, the instrumented protective function, or combinations thereof simultaneously as the update is input to the model.

24. The method of claim 1, further comprising using computer instructions to generate a safety requirements specification for the safety instrumented system and using computer instructions allowing a user to edit the safety requirements specification for the safety instrumented system.

25. The method of claim 1, further comprising using computer instructions 631 to support management of change (MOC) for data records by supporting "Master" records, being untouched while "Project" copies of the data records are edited and manipulated by users, which operation is also known as "sandbox".

26. The method of claim 25, further comprising using computer instructions to check each edited record, mark each record as checked, approved, and then move the checked and approved record to "Master" records.

27. The method of claim 1, further comprises using computer instructions to allow users to enter data and perform analysis to support process hazard analysis and layers of protection analysis.

28. The method of claim 1, further comprising using computer instructions to connect data of the process hazard analysis and layers of protection analysis to the safety integrity level calculations.

29. The method of claim 1, further comprising using computer instructions to support analysis of protection layers to be applied to reduce probability of a hazardous event occurring.

30. The method of claim 1, further comprising using computer instructions to include analysis to calculate the safety integrity level calculations required to reduce risk to a target level.

31. The method of claim 1, further comprises using computer instructions to allow users to enter tolerable risk criteria for the facility.

32. The method of claim 1, further comprising using computer instructions to support revision tracking and impact reporting on proposed changes.

33. The method of claim 32, further comprising using computer instructions to allow users to enter proposed changes and view impact reports prior to approving changes.

34. The method of claim 1, further comprising using computer instructions to allow users to enter initiating causes captured in the facility that require the safety instrumented system or independent protection layers to respond.

35. The method of claim 1, further comprising using computer instructions to allow users to manage imports of process hazard analysis and layers of protection analysis from other tools.

36. The method of claim 1, further comprising using computer instructions to analyze the safety integrity level calculations and automatically identify optimum proof test intervals to meet the safety integrity level calculations.

37. The method of claim 1, further comprising using computer instructions to enable a specific component to be entered for use in the instrumented protective function during design phase of a project.

38. The method of claim 1, further comprising using computer instructions to allow searching for a specific component by the tag name to support process hazard analysis and layers of protection analysis.

39. The method of claim 1, further comprising using computer instructions to create a report showing specific component information for like components used for risk reduction in the process hazard analysis and layers of protection analysis for the facility.

40. The method of claim 1, further comprising using computer instructions to create a recommendations log from the risk assessment.

41. The method of claim 40, further comprising using computer instructions to allow users to search the recommendations log based on: the tag name, the facility, a module, an area, the instrumented protective functions name, or a process hazard analysis node number.

42. The method of claim 1, further comprising using computer instructions to allow calculations that allow users to compare at least two possible architectures for a safety instrumented function.

43. The method of claim 42, further comprising using computer instructions that allow users to create copies of a first possible architecture and make modifications of the first possible architecture.

44. The method of claim 43, further comprising using computer instructions that allow users to change the architecture currently marked for use.

45. The method of claim 1, further comprising using computer instructions to import data for an existing facility asset management system to populate a component library in the data storage.

46. The method of claim 1, further comprising using computer instructions to create a report identifying deviations between the facility asset management system of the facility and the imported data in the data storage.

47. The method of claim 1, further comprising using computer instructions to enable editing of cause and affect documents, and allow the users to add cause and effect documents not used in the safety integrity level calculations.

48. The method of claim 1, further comprising using computer instructions to create protections layers not used in layers of protection analysis or the safety integrity level calculations.

49. The method of claim 1, further comprising using computer instructions to enter effects as additional actions into the formed computer generated safety instrumented model.

50. The method of claim 1, further comprising using computer instructions to enable display and viewing of reports of project status.

51. The method of claim 1, further comprising using computer instructions to generate facility acceptance tests using a software model of physical and functional specifications.

52. The method of claim 1, further comprising using computer instructions to generate test plans for each safety instrumented function of the instrumented protective function.

53. The method of claim 1, further comprising using computer instructions to generate a critical alarm list including risk ranking of hazards to which alarms apply.

54. The method of claim 53, further comprising using computer instructions to generate a report of test performance for critical alarms.

55. The method of claim 1, further comprising using computer instructions to generate a report showing impact of bypassing on a risk gap being opened by placing equipment in bypass.

56. The method of claim 1, further comprising using computer instructions in the data storage assign a tag name to at least one component identifier while assigning the voting instruction to the at least one assembly identifier and at least one assembly group identifier, creating the computer generated safety instrumented model with a functional specification and a physical specification for all of the instrumented protective functions for a facility in real time.

57. In the method of claim 1, further comprising using computer instructions to determine functional relationships between assembly groups and assemblies, and computer instructions to create a tag based software model which can have tags and voting instructions, to be used between assembly groups and assemblies.

\* \* \* \* \*